United States Patent
Asahi

(10) Patent No.: US 8,040,417 B2
(45) Date of Patent: Oct. 18, 2011

(54) IMAGING ELEMENT SUITABLE FOR READOUT CHARGES IN PLURAL TIMES IN A TIME DIVIDING MANNER IN ONE HORIZONTAL SCANNING PERIOD

(75) Inventor: Tsunemori Asahi, Azumino (JP)

(73) Assignee: Seiko Epson Corporation, Tokyo (JP)

( * ) Notice: Subject to any disclaimer, the term of this patent is extended or adjusted under 35 U.S.C. 154(b) by 395 days.

(21) Appl. No.: 12/409,591

(22) Filed: Mar. 24, 2009

(65) Prior Publication Data

US 2009/0237524 A1    Sep. 24, 2009

(30) Foreign Application Priority Data

Mar. 24, 2008    (JP) .................. 2008-075310

(51) Int. Cl.
*H04N 3/14* (2006.01)
*H04N 5/335* (2011.01)

(52) U.S. Cl. .............. 348/302; 250/208.1; 348/308

(58) Field of Classification Search .......... 348/302, 348/308
See application file for complete search history.

(56) References Cited

U.S. PATENT DOCUMENTS

| 7,420,604 B2* | 9/2008 | Nasu | 348/302 |
| 7,852,386 B2* | 12/2010 | Aoki | 348/245 |
| 7,897,969 B2* | 3/2011 | Muramatsu et al. | 257/59 |
| 2008/0284876 A1* | 11/2008 | Makino | 348/231.99 |
| 2008/0284883 A1 | 11/2008 | Asahi | |
| 2009/0009643 A1* | 1/2009 | Muroshima et al. | 348/308 |
| 2009/0066825 A1* | 3/2009 | Nezaki et al. | 348/308 |
| 2010/0085458 A1* | 4/2010 | Horiguchi | 348/308 |

FOREIGN PATENT DOCUMENTS

| JP | A-2007-194981 | 8/2007 |
| JP | A-2008-288946 | 11/2008 |

* cited by examiner

*Primary Examiner* — Ngoc-Yen Vu
(74) *Attorney, Agent, or Firm* — Oliff & Berridge, PLC

(57) ABSTRACT

An imaging element that performs a processing with respect to a predetermined line of a plurality of photoelectric conversion elements in plural times in a time dividing manner in each horizontal scanning period, includes a photoelectric conversion unit; an address generating unit that generates an address indicating a position of the line of an object for each of a plurality of divided periods formed by time-dividing the each horizontal scanning period; an address decoding unit activating the photoelectric conversion elements on a line position corresponding to the address; a period determination signal generating unit that generates a period determination signal indicating one of validity and invalidity of the processing with respect to each of the divided periods; a control signal generating unit that generates a control signal for performing the processing in each of the plurality of divided periods; a processing performing unit performing the processing with respect to the line of the photoelectric conversion elements; and a supply control unit allowing the control signal to be supplied to the processing performing unit when a corresponding divided period is valid, and preventing the control signal from being supplied to the processing performing unit when the divided period is invalid.

10 Claims, 7 Drawing Sheets

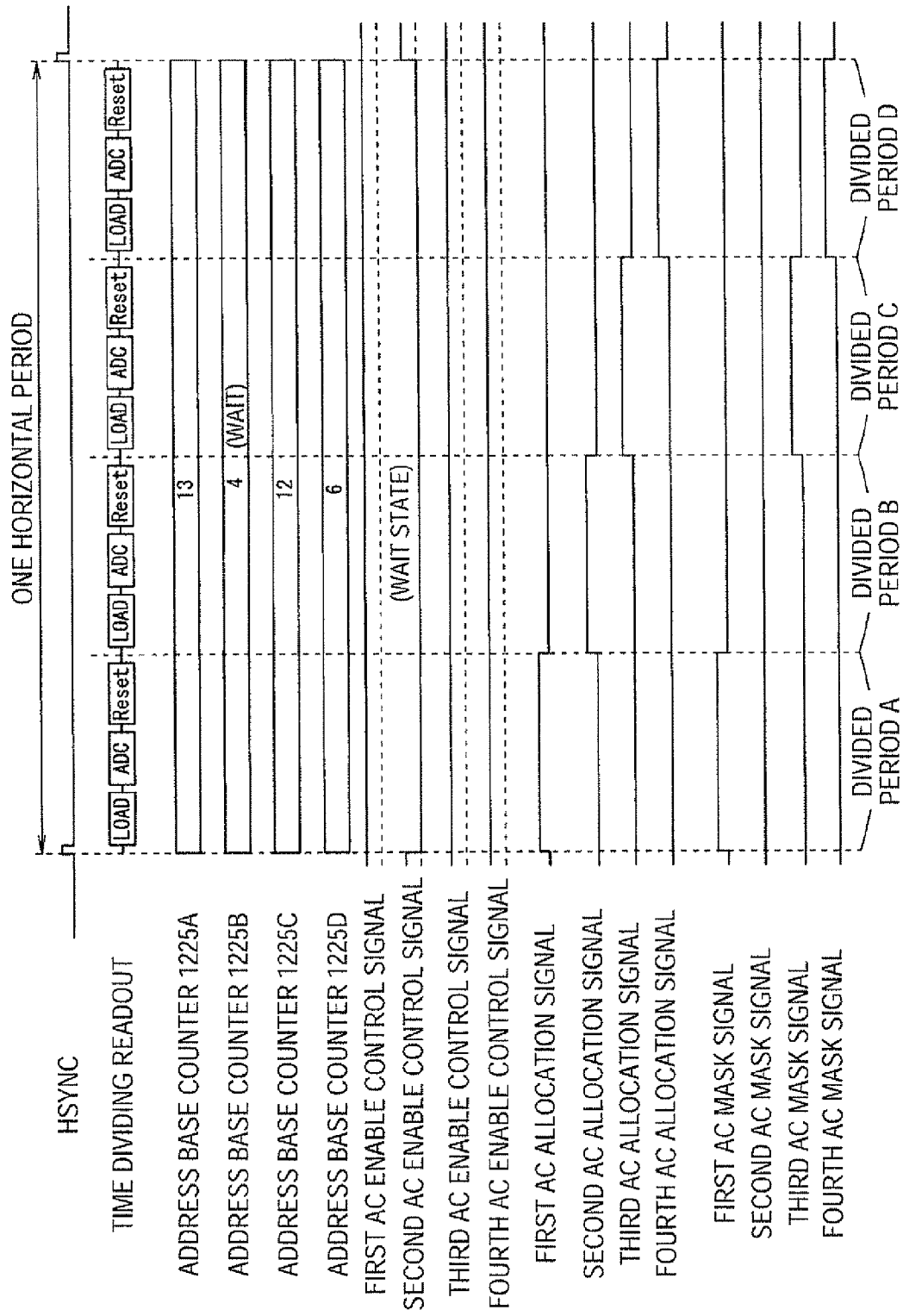

IMAGING ELEMENT SUITABLE FOR READOUT CHARGES IN PLURAL TIMES IN A TIME DIVIDING MANNER IN ONE HORIZONTAL SCANNING PERIOD

BACKGROUND

1. Technical Field

An aspect of the presents invention relate to an imaging element that includes a photoelectric conversion section formed by arranging a plurality of photoelectric conversion elements in matrix and performs a processing related to readout of accumulated charges with respect to a predetermined pixel line composed of the photoelectric conversion elements in plural times in a time dividing manner in one horizontal scanning period.

2. Related Art

Examples of a solid state imaging system include a CCD (charge coupled device) type image sensor (hereinafter, simply referred to as a "CCD sensor") and a CMOS type image sensor (hereinafter, simply referred to as a "CMOS sensor"). Further, a MOS (metal oxide semiconductor) type solid state imaging system depending on a threshold voltage shift (hereinafter, simply referred to as a "substrate modulation sensor") is also proposed. The MOS type solid state imaging system provides high picture quality and low power consumption. The CMOS sensor and the substrate modulation sensor (hereinafter, referred to as "the CMOS sensor and the like") have been recently developed because of their low electric consumption and low processing cost compared to the CCD sensor.

The CMOS sensor and the like employ a rolling shutter mode in which a processing is performed line by line when charges accumulated in photodiodes that are photoelectric conversion elements are read out or when charges accumulated in the photodiodes are reset.

The CMOS sensor is a sensor performing a destructive readout processing or a sensor performing a nondestructive readout processing. The former always performs a shutter (reset) processing after the readout of accumulated charges. Therefore, the accumulated charges are depleted after the readout. The latter leaves the accumulated charges without resetting even after the readout, so that the readout of the accumulated charges can be performed in many times in different exposing times. Therefore, in the CMOS sensor performing a nondestructive readout, plural times of readout processings can be performed in a time dividing manner in one horizontal scanning period.

As a technique of performing such readout in a time dividing manner, JP-A-2007-194981 discloses a physical information acquisition device, for example.

The physical information acquisition device of the example sets a readout address R and drive controls for respective unit pixels of a shutter address S for setting a charge storage time in the readout address R in a time dividing manner and drives corresponding unit pixels at predetermined timing. Accordingly, addresses can be set with a common address decoding circuit. Therefore, in a case of increasing the number of time divisions, the number of the address decoding device is not required to be increased.

However, the related art of the above example needs to increase the number of circuits generating a control signal for driving an imaging section as the number of the time divisions increases.

SUMMARY

An advantage of the present invention is to provide an imaging element that is suitable for performing a processing related to readout of accumulated charges in plural times in a time dividing manner in one horizontal scanning period.

An imaging element, according to a first aspect of the invention, that performs a processing, which is related to readout of accumulated charges, with respect to a predetermined line of a plurality of photoelectric conversion elements in plural times in a time dividing manner in each horizontal scanning period, includes: a photoelectric conversion unit having a structure in which the plurality of photoelectric conversion elements, which convert received light into a charge, are arranged in matrix and form a plurality of lines including the predetermined line; an address generating unit that generates an address indicating a position of the line of a processing objects for each of a plurality of divided periods formed by time-dividing the each horizontal scanning period, and outputs the address that is generated in each of the divided periods in sequence; an address decoding unit activating the photoelectric conversion elements on a line position corresponding to the address, which is sequentially outputted from the address generating unit, in each of the divided periods; a period determination signal generating unit that generates a period determination signal indicating one of validity and invalidity of the processing with respect to each of the divided periods and sequentially outputs the period determination signal that is generated in each of the divided periods; a control signal generating unit that generates a control signal for performing the processing in each of the plurality of divided periods and sequentially outputs the control signal that is generated in each of the divided periods; a processing performing unit performing the processing with respect to the line of the photoelectric conversion elements, which are activated by the address decoding unit, based on the control signal; and a supply control unit allowing the control signal, which is sequentially outputted from the control signal generating unit, to be supplied to the processing performing unit when a corresponding divided period is valid, and preventing the control signal from being supplied to the processing performing unit when the divided period is invalid, based on the period determination signal.

In such structure, when the address generating unit generates an address of a line of a processing object in each of the divided periods, the address decoding unit activates the photoelectric conversion elements on the line corresponding to the address that is generated in each of the divided periods in sequence.

Meanwhile, the period determination signal generating unit generates a period determination signal indicating validity or invalidity of the processing in each of the divided periods and outputs the period determination signal that is generated. In addition, the control signal generating unit sequentially generates a control signal for allowing the processing performing unit to perform the processing in each of the plurality of divided periods and sequentially outputs the control signal that is generated in each of the divided periods.

Responding to the output of the period determination signal and the control signal in each of the divided periods, the supply control unit receives these signals. Based on the period determination signal that is received, the supply control unit supplies the control signal that is received to the processing performing unit when a corresponding divided period is valid, and the supply control unit does not supply the control signal that is received to the processing performing unit when the corresponding divided period is invalid.

Receiving the control signal, the performing unit performs the processing, which is related to the readout of accumulated charges, with respect to the photoelectric conversion elements forming the line and activated by the address decoding unit, based on the control signal.

That is, the control signal generating unit is capable of generating a control signal with respect to each of the divided periods and sequentially outputting the control signal in each of the divided periods. Thus control signals can be generated by a common circuit. Therefore, even though the number of time divisions is increased, the imaging element can be structured without increasing the number of circuits that generate a control signal.

Further, whether a control signal is supplied to the processing performing unit in each of the divided periods can be controlled by the period determination signal. Therefore, if there is a period in which the processing needs to be stopped temporarily among the divided periods, for example, an execution of the processing can be stopped by outputting a period determination signal indicating invalidity with respect to the period. Thus, an execution and a stop of the processing can be easily controlled without controlling at the control signal generating unit.

Specifically, for example, in a case where a content of the processing related to the readout is common in all of the divided periods, the control signal generating unit repeatedly outputs the same control signal. In such case, when the processing needs to be temporarily stopped in a certain divided period, it is enough to invalidate the period determination signal while leaving the control signal generating unit outputting. That is, the circuit structure of the control signal generating circuit can be simplified.

Here, the processing related to the readout of accumulated charges includes a part or all of the following processings: a processing of reading out the accumulated charges accumulated in the photoelectric conversion elements; a processing of converting an analog signal of the accumulated charges that are read out into a digital signal; a processing of adjusting a level of the analog signal of the accumulated charges that are read out; a processing of removing a fixed pattern noise included in the analog signal; a processing of resetting the accumulated charges accumulated in the photoelectric elements; a processing of outputting the digital signal; and the like. Hereinafter, the description is common to an imaging element of a second aspect.

The control signal is used for allowing the processing performing unit to perform each of the processings. Hereinafter, the description is common to an imaging element of the second aspect.

The processing performing unit includes various circuits for performing the processings related to the readout. The various circuits are a drive pulse generator, a timing controller, a circuit for reading out a signal from the photoelectric conversion elements, an AGC circuit, an A/D converter, and the like. Hereinafter, the description is common to the imaging element of the second aspect.

The imaging element according to the first aspect, further includes: address counters of at least the same number as the number of time divisions; an operation control unit separately controlling an operation of each of the address counters; an address selecting circuit sequentially selecting an address counter from the address counters in a time dividing manner and outputting a count value of the address counter that is selected as an address indicating a position of the line; an address counter enable control signal generating unit generating an address counter enable control signal indicating one of a state that each of the address counters is enabled and a state that each of the address counters is disabled in the each horizontal scanning period, and outputting the address counter enable control signal that is generated; and an address counter allocation signal generating unit generating an address counter allocation signal indicating one of a state that each of the address counters is allocated and a state that each of the address counters is free from an allocation with respect to each of the divided periods, and outputting the address counter allocation signal that is generated. In the imaging element, the period determination signal generating unit may generate the period determination signal indicating validity of the processing in a state of a first combination of the address counter enable control signal indicating an enabled state and the address counter allocation signal indicating an allocated state, and may generate the period determination signal indicating invalidity of the processing in a state of a combination other than the state of the first combination.

With such structure, when the processings related to the readout are performed in a time dividing manner, an appropriate address can be generated and the address that is generated can be decoded at an appropriate timing by separately controlling counting operations of the address counters that are provided in at least the same number as the number of time divisions.

For example, each horizontal scanning period is divided into N periods. With the structure, counting operations of the address counters can be separately controlled, so that the imaging element can generate addresses, by which N kinds of readout processings and resetting processings of accumulated charges are performed, in a time dividing manner, and can decode the addresses that are generated in the time dividing manner. Accordingly, the imaging element can perform various readout processings: reading out charges from a part of the photoelectric conversion elements of the photoelectric conversion section at high speed, reading out charges while skipping arbitrary number of lines, and an interlaced readout.

An address counter for the readout and an address counter for the reset processing can be separately controlled, so that a timing of the readout and a timing of the reset can be accurately controlled.

Further, the address counter enable control signal generating unit generates an address counter enable control signal (hereinafter, referred to as an AC enable control signal) indicating a state whether each of the address counters is enabled or disabled in each horizontal scanning period and outputs the signal. The address counter allocation signal generating unit generates an address counter allocation signal (hereinafter, referred to as an AC allocation signal) indicating a state whether each of the address counters is allocated in each of the divided periods.

The AC enable control signal is generated with respect to each of the address counters and indicates whether a count value of each of the address counters in each horizontal scanning period is valid or invalid.

The AC allocation signal is generated with respect to each of the address counters and indicates to which period each of the address counters is allocated (corresponds) among the plurality of divided periods in one horizontal scanning period.

The period determination signal generating unit generates a period determination signal indicating validity of the processings related to the readout in a period in a state of a first combination of the AC enable control signal indicating that the address counter is enabled and the AC allocation signal indicating that the address counter is allocated, and generates a period determination signal indicating invalidity of the processings in a period in a state of a combination other than the state of the first combination. That is, in at least one state of the state that the AC enable control signal indicates that the address counter is disabled and the state that the AC allocation signal indicates that the address counter is not allocated, a period determination signal indicating invalidity of the processings is generated.

Accordingly, it can be easily set which address counters are not allowed to perform the processings in each horizontal scanning period, by the AC enable control signal, and each of the address counters can be easily allocated with respect to each of the divided periods, by the AC allocation signal.

Further, when the address counter is disabled, supply control of the control signal can be performed by the period determination signal so as to securely prevent the processings related to the readout from being performed with respect to the divided period in which the disabled address counter is allocated.

In the imaging element according to the first aspect, the address counter enable control signal generating unit may generate the address counter enable control signal that indicates the enabled state and a disabled state respectively by two kinds of signal states of a high level and a low level. Further, the address counter allocation signal generating unit may generate the address counter allocation signal that indicates the allocated state and a non-allocated state respectively by two kinds of signal states of a high level and a low level. Furthermore, the period determination signal generating unit may include a first AND calculating section performing an AND operation between the address counter enable control signal and the address counter allocation signal, and may generate the period determination signal based on a signal indicating a calculation result obtained by the first AND calculating section.

In such structure, by generating the AC enable control signal in a manner relating the high level (hereinafter, referred to as H level) of the signal to "enabled" and relating the low level (hereinafter, referred to as L level) of the signal to "disabled", whether the address counter is enabled or disabled can be easily determined. In a similar way, by generating the AC allocation signal in a manner relating the H level to a state with an allocation and relating the L level to a state with no allocation, whether the address counter is allocated or not is easily determined.

Further, the period determination signal generating unit can generate the period determination signal based on a result of an AND operation between the AC enable control signal and the AC allocation signal. Therefore, by relating the H level of each of the signals to an enabled state or an allocated state, for example, when the AC enable control signal and the AC allocation signal are at H level, a period determination signal at H level can be generated from an AND operation of these signals. Accordingly, the supply control of the control signal can be easily and appropriately performed.

In the imaging element according to the first aspect, the supply control unit may include a second AND calculating section performing an AND operation between the control signal and the period determination signal, and supply a signal indicating a calculation result obtained by the second AND calculating section to the processing performing unit.

In such structure, the supply control of the control signal can be appropriately performed only with an AND operation between the period determination signal and the control signal. Thus the supply control of the control signal can be easily performed.

The imaging element according to the first aspect, further includes a control information acquisition unit acquiring control information for controlling each of the address counters. In the imaging element, the operation control unit may separately control each of the address counters based on the control information acquired at the control information acquisition unit.

With such structure, each of the address counters can perform an arbitrary counting operation with the control information.

The imaging element according to the first aspect, further includes a base counter performing a counting operation based on a counter update clock generated based on a horizontal synchronizing signal. In the imaging element, the control information may include an offset value of each of the address counters. Further, when the offset value and a count value of the base counter agree, the operation control section may allow each of the address counters to start the counting operation with a timing of the agreement as a trigger.

In such structure, a timing of a start of a counting operation of each of the address counters can be controlled in accordance with a count value of the base counter that performs the counting operation with a horizontal synchronizing signal or a signal obtained by sampling the horizontal synchronizing signal by an internal operation clock as a trigger. Therefore, the exposing time can be easily controlled with respect to various readout processings performed in a time dividing manner in each horizontal scanning period.

In the imaging element according to the first aspect, the control information may include a step width value, a start line value, and a line width value of each of the address. Further, the operation control section may set a step width in the counting operation of each of the address counters based on the step width value and allow each of the address counters to count by the step width that is set; set an initial value of each of the address counters based on the start line value and allow each of the address counters to start the counting operation from the initial value that is set; and set a maximum count value of each of the address counters based on the line width value and allow each of the address counters to perform the counting operation in a range from the initial value to the maximum count value that is set.

In such structure, each of the address counters performs the counting by the step width set by the step width value that is included in the control information. Therefore, with the control information for setting a desired step width value, each of the address counters can perform the counting by the desired step width. Accordingly, the imaging element performs the readout of the charges while skipping lines forming the same width as the step width, thus being able to perform a high speed readout processing of charges.

Further, each of the address counters starts the counting from the initial value set by the start line value that is included in the control information, of the address counter. Therefore, with the control information for setting a desired initial value, each of the address counters can start the counting from the desired initial value. Accordingly, the imaging element can start the readout processing and the reset processing of the accumulated charges from a photoelectric conversion element on an arbitrary position in the photoelectric conversion section.

Further, each of the address counters can perform the counting operation in a range up to the maximum count value set by the line width value that is included in the control information. Therefore, the imaging element can perform the readout processing and the reset processing of the accumulated charges with respect only to an area, formed by the photoelectric conversion elements on a line position corresponding to each count value from the initial value to the maximum count value, of the photoelectric conversion section.

Here, when the step width is "1", the count value increases by 1 as 1, 2, 3, . . . , and when the step width is "2", the count value increases by 2 as 1, 3, 5, . . . (in a case of up-counting and an initial value of the counter is "1"). On the other hand, in a case of down-counting, when the step width is "1", the count value decreases by 1 as . . . , 3, 2, 1, and when the step width is "2", the count value decreases by 2 as . . . , 5, 3, 1. That is, when the step width is "n", the count value increases by n with respect to the initial value of the counter as 1, 1+n, 1+2n, . . . , in a case of up-counting, and the count value decreases by n with respect to the initial value m of the counter as . . . , m−n, m−2n, m−3n, . . . , in a case of down-counting.

In the imaging element according to the first aspect, a repeating mode in which the address counters repeatedly perform the counting operation in the range from the initial value to the maximum count value in succession can be set in the address counters, and the operation control section may allow the address counters in which the repeating mode is set to repeatedly perform the counting operation in the range from the initial value that is set to the maximum value that is set in succession.

With such structure, the imaging element can repeatedly perform the readout processing and the reset processing of the accumulated charges with respect to an area formed by the photoelectric conversion elements on a line position corresponding to each count value from the initial value to the maximum count value. Accordingly, for example, while sequentially reading out the charges line by line in the whole area of the photoelectric conversion section, the imaging element can read out the charges from a part of the photoelectric conversion section in plural times in succession.

In the imaging element according to the first aspect, the control information may include a wait value of each of the address counters. Further, the operation control section may set a wait count number that is a count number for a wait of each of the address counters based on the wait value, allow the address counters, to which the repeating mode is set, to count the wait count number that is set every time one counting operation is finished in the counting operation repeatedly performed, and output a signal invalidating a count value during the counting of the wait count number to the address decoding unit.

With such structure, a wait can be interposed between one counting operation and another counting operation when the counting operation is performed repeatedly. Therefore, for example, when the readout processing of the charges is repeatedly performed with respect to an area of lines of arbitrary number, frame synchronization is easily realized.

An imaging element, according to a second aspect of the invention, that performs a processing, which is related to readout of accumulated charges, with respect to a predetermined line of a plurality of photoelectric elements in plural times in a time dividing manner in each horizontal scanning period, comprising: a photoelectric conversion unit having a structure in which the plurality of photoelectric conversion elements, which convert received light into a charge, are arranged in matrix and form a plurality of lines including the predetermined line; an address generating unit that generates an address indicating a position of the line of a processing object for each of a plurality of divided periods formed by time-dividing the each horizontal scanning period, and outputs the address that is generated in each of the divided periods in sequence; an address decoding unit activating the photoelectric conversion elements on a line position corresponding to the address, which is sequentially outputted from the address generating unit, in each of the divided periods; a period determination signal generating unit that generates a period determination signal indicating one of validity and invalidity of the processing with respect to each of the divided periods and sequentially outputs the period determination signal that is generated in each of the divided periods; a control signal generating unit that generates a control signal for performing the processing in each of the plurality of divided periods and sequentially outputs the control signal that is generated in each of the divided periods; and a processing performing unit performing the processing with respect to the line of the photoelectric conversion elements, which are activated by the address decoding unit, based on the control signal outputted from the control signal generating unit.

In the structure of the second aspect, when the address generating unit generates an address of a line of a processing object in each of the divided periods, the address decoding unit activates the photoelectric conversion elements on the line corresponding to the address that is generated in each of the divided periods in sequence.

Meanwhile, the period determination signal generating unit generates a period determination signal indicating validity or invalidity of the processing in each of the divided periods and outputs the period determination signal that is generated. In addition, the control signal generating unit generates a control signal for allowing the processing unit to perform the processing in each of the divided periods in a time dividing manner and sequentially outputs the control signal that is generated in each of the divided periods.

The processing performing unit performs processing, which is related to the readout of accumulated charges, with respect to the line that is activated by the address decoding unit, based on the control signal that is sequentially outputted.

That is, the control signal generating unit generates a control signal with respect to each of the divided periods in a time dividing manner and sequentially outputs the control signal in each of the divided periods. Thus control signals can be generated by a common circuit. Therefore, even though the number of time divisions is increased, the imaging element can be structured without increasing the number of circuits generating a control signal.

BRIEF DESCRIPTION OF THE DRAWINGS

The invention will be described with reference to the accompanying drawings, wherein like numbers reference like elements.

FIG. 3 is a diagram showing an operation example of an address selecting circuit 123a.

FIG. 6 is a timing chart of each signal generated in the readout reset line address generating section 12 and the timing control section 13.

DESCRIPTION OF EXEMPLARY EMBODIMENT

An embodiment of the invention will be described with reference to the accompanying drawings below. FIGS. 1 to 7 are diagrams showing an address generating device and an imaging element according to the embodiment of the invention.

Figure 1:
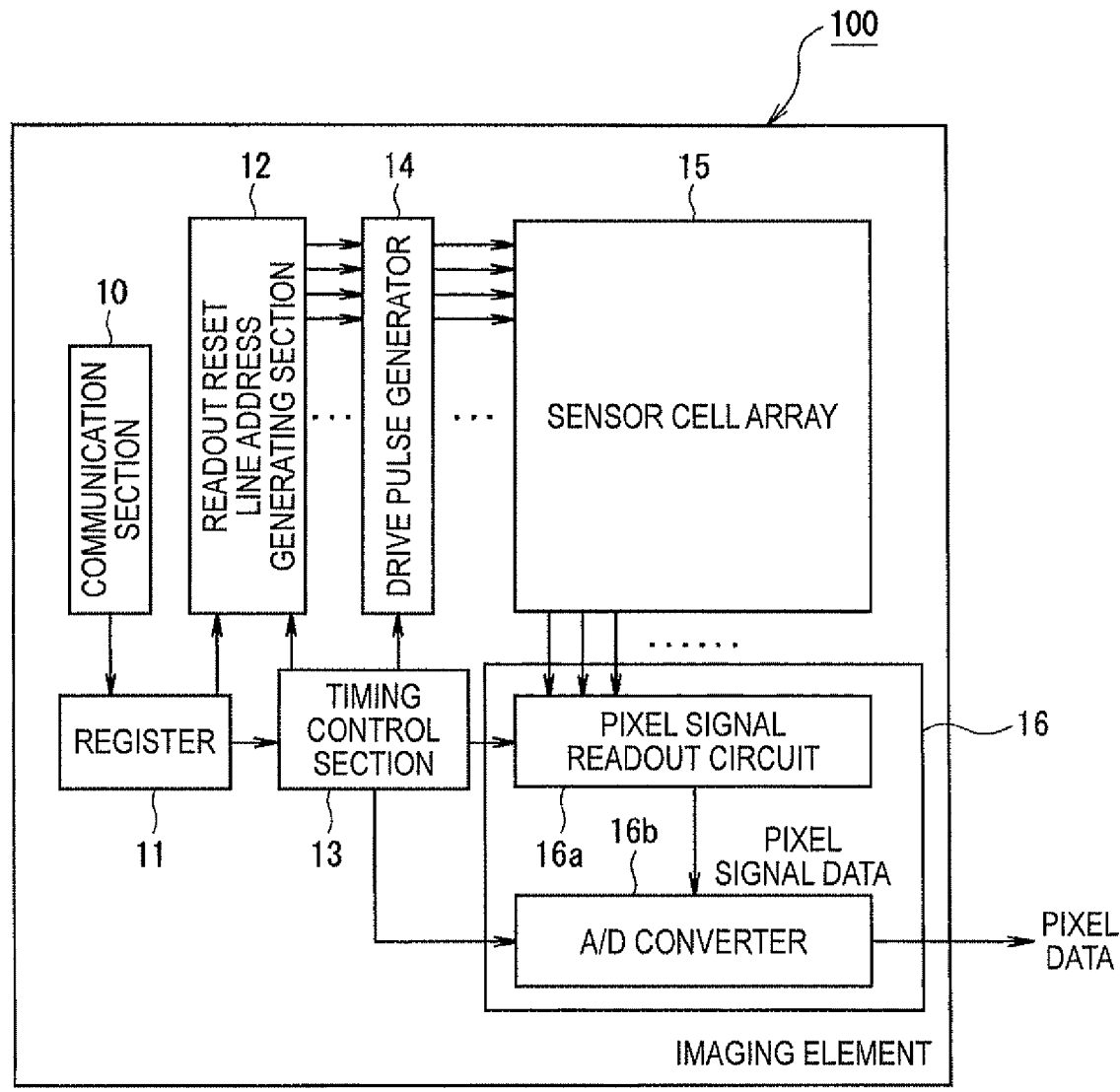
FIG. 1 is a block diagram showing a structure of an imaging element 100 according to an embodiment of the invention.

A structure of the imaging element of the embodiment will be described with reference to FIG. 1. FIG. 1 is a block diagram showing a structure of an imaging element 100 according to the embodiment.

The imaging element 100 includes: a communication section 10, a register 11, a readout reset line address generating section 12, and a timing control section 13. The communication section 10 sends and receives data to and from an external system controller (not shown). The register 11 stores various data received from the system controller. The readout reset line address generating section 12 generates an address indicating a line position of a sensor cell that is a processing object of a processing related to readout of accumulated charges such as a readout processing of accumulated charges and a reset processing of the accumulated charges in a sensor cell array 15. The timing control section 13 controls an operating timing of each component.

The communication section 10 receives control data, for example, for controlling an operation of an address counter in the readout reset line address generating section 12 from the system controller (not shown) and stores the control data in the register 11.

The readout reset line address generating section 12 generates an address indicating a line position of a processing object and related to readout of accumulated charges in each of divided periods so as to sequentially activate sensor cells on the line position corresponding to the generated address. The divided periods are a plurality of periods obtained by dividing one horizontal scanning period.

The timing control section 13 generates control signals (a pixel clock, a horizontal synchronizing signal, a vertical synchronizing signal, and an execution control signal) for drive-controlling the readout reset line address generating section 12, a drive pulse generator 14, and a horizontal transfer section 16 and arbitrarily selects a signal among these so as to output the signal to each component.

The imaging element 100 further includes the drive pulse generator 14, the sensor cell array 15, and the horizontal transfer section 16. The drive pulse generator 14 generates a signal for driving sensor cells on a selected line based on a selecting signal from the readout reset line address generating section 12 and various control signals from the timing control section 13. The horizontal transfer section 16 outputs pixel signal data (analog data), which is composed of electric charges that are read out from the sensor cells on the selected line, by a line unit.

The drive pulse generator 14 generates a drive pulse signal for performing a readout processing and a reset processing based on the selecting signal from the readout reset line address generating section 12 and outputs the drive pulse signal that is generated to the sensor cell array 15. In the readout processing, charges accumulated in sensor cells that are selected by the selecting signal are read out. In the reset processing, the charges accumulated in the sensor cells are depleted (reset).

The sensor cell array 15 is composed of a plurality of sensor cells (pixels) formed by a CMOS technique and arranged in matrix. In the sensor cell array 15, an address line, a reset line, and a readout line are commonly coupled to the sensor cells on each line, and various drive pulse signals are sent to the sensor cells forming each line through the above three control lines. When the address line and the readout line are activated, the accumulated charges are transferred to the horizontal transfer section 16 through the readout line.

The horizontal transfer section 16 includes a pixel signal readout circuit 16a and an A/D converter 16b.

The pixel signal readout circuit 16a reads out pixel signal data at a level corresponding to an amount of the accumulated charges from each pixel on the selected line of the sensor cell array 15, and stores the pixel signal data that is read out in a line memory (not shown) by each line of the each pixel.

The A/D converter 16b converts the pixel signal data that is analog data and is stored in the line memory into digital data (hereinafter, referred to as pixel data), and outputs the pixel data, which is generated by the conversion, in a line unit.

Internal structures of the readout reset line address generating section 12 and the timing control section 13 will be described with reference to FIGS. 2 and 3.

Figure 2:
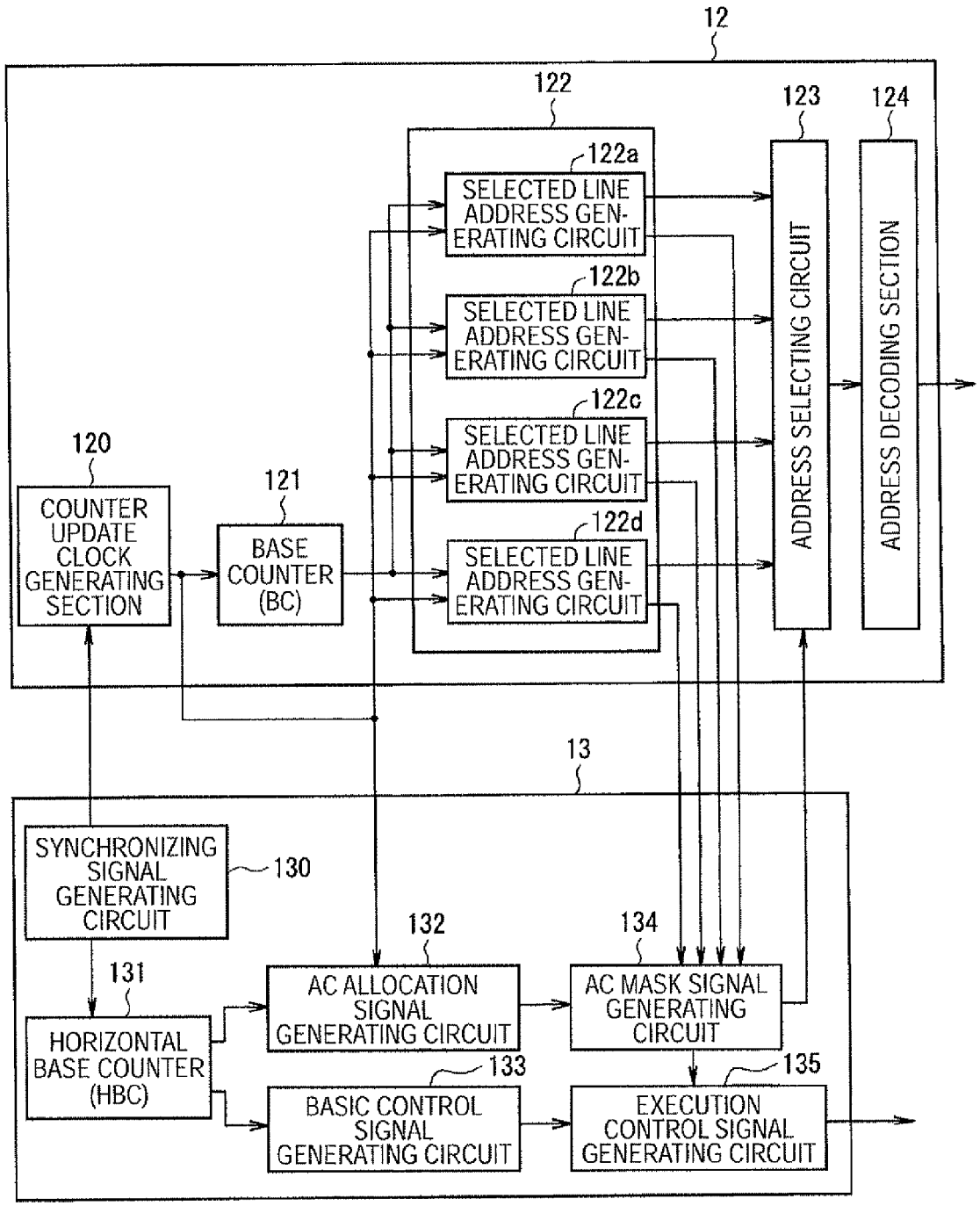
FIG. 2 is a block diagram showing internal structures of a readout reset line address generating section 12 and a timing control section 13.

FIG. 2 is a block diagram showing the internal structures of the readout reset line address generating section 12 and the timing control section 13. FIG. 3 is a diagram showing an operation example of an address selecting circuit 123a.

Referring to FIG. 2, the readout reset line address generating section 12 includes a counter update clock generating section 120, a base counter 121, a selected line address generating section 122, an address selecting circuit 123, and an address decoding section 124.

The counter update clock generating section 120 generates a clock based on a pixel clock (CLK) and a horizontal synchronizing signal (HSYNC) that are received from the timing control section 13 and outputs the clock to the base counter 121 and each of selected line address generating circuits 122a to 122d of the selected line address generating section 122. The clock is a scanning period of sensor cells on one line of the sensor cell array 15.

For example, the counter update clock generating section 120 may output the horizontal synchronizing signal received from the timing control section 13 as it is, or may sample the horizontal synchronizing signal by an internal operational clock so as to newly generate and output a counter update clock. In the present embodiment, the latter method is employed.

The base counter 121 performs a counting operation based on the counter update clock received from the counter update clock generating section 120 and the pixel clock and a vertical synchronizing signal (VSYNC) received from the timing control section 13. Specifically, the base counter 121 repeatedly counts in a range (20) of "the number of active pixel lines (16, for example)+the number of retracing pixel lines (4, for example)" with respect to the sensor cell array 15.

The selected line address generating section 122 includes selected line address generating circuits in the same number as the number of time divisions for processings related to readout of accumulated charges in one horizontal scanning period, separately controls each of the selected line address generating circuits based on various control data stored in the register 11, and generates an address indicating a line position of a processing object. In the embodiment, each horizontal scanning period is evenly divided into four periods. Hereinafter, the four divided periods are respectively referred to as divided periods A to D in a time-series order.

One horizontal scanning period is divided into the four divided periods A to D, so that the selected line address generating section 122 includes four circuits, namely, the selected line address generating circuits 122a to 122d.

The address selecting circuit 123 selects the selected line address generating circuits 122a to 122d one by one in sequence in each of the divided periods, and sends an address (a count value), which is generated in the selected line address generating circuit that is selected, based on a first to fourth AC mask signal, to the address decoding section 124 in a case where an address counter is enabled.

Specifically, the selected line address generating circuit is allocated in advance to each of the divided periods A to D in each horizontal scanning period. The address selecting circuit 123 first selects a selected line address generating circuit corresponding to each of the divided periods based on the allocation content.

Figure 3:
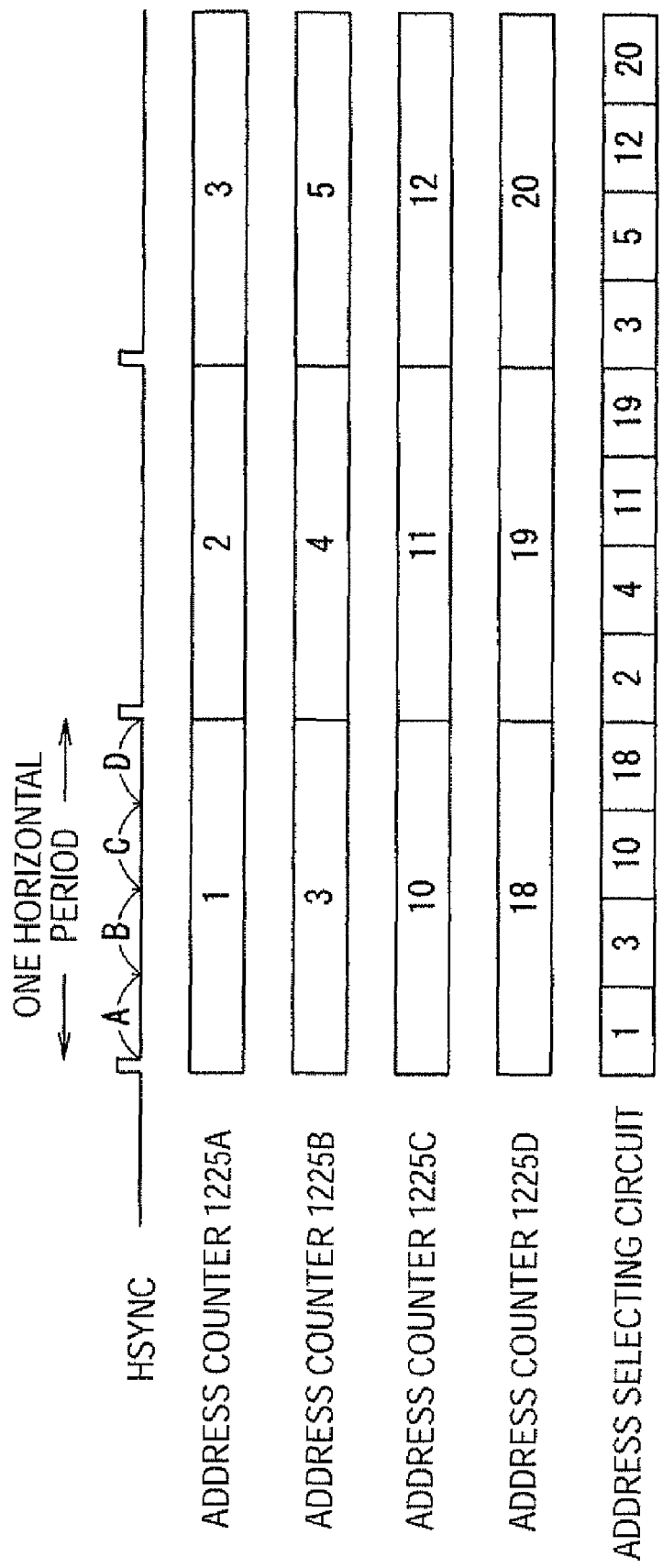

In the embodiment, the selected line address generating circuits 122a to 122d are respectively allocated to the divided periods A to D, as shown in FIG. 3. Then the selected line address generating circuits that are allocated are sequentially selected in an order of the divided periods A to D.

In a case where the AC mask signal with respect to the selected line address generating circuit that is selected is at H level, an address inputted from the circuit is outputted to the address decoding section 124 as a valid address. While, in a case where the AC mask signal is at L level, the address inputted from the circuit is invalid. In this case, a signal indicating the invalidity is outputted to the address decoding section 124. Thus, a maximum of four addresses is sequentially outputted to the address decoding section 124 in a time dividing manner in one horizontal scanning period.

Here, switching of the selected line address generating circuits by the address selecting circuit 123 is controlled (select-controlled) by the timing control section 13 (details are described later).

When the address decoding section 124 receives the address (the count value) from the address selecting circuit 123, the address decoding section 124 outputs a selecting signal for enabling (activating) sensor cells, which are on the line position indicated by the address that is inputted, in the sensor cell array 15.

On the other hand, referring to FIG. 2, the timing control section 13 includes a synchronizing signal generating circuit 130, a horizontal base counter (HBC) 131, an AC allocation signal generating circuit 132, a basic control signal generating circuit 133, an AC mask signal generating circuit 134, and an execution control signal generating circuit 135.

The synchronizing signal generating circuit 130 generates a pixel clock (PCLK), a vertical synchronizing signal (VSYNC), and a horizontal synchronizing signal (HSYNC) based on a control signal generated outside or inside thereof and a reference clock signal (CLK) from a reference clock signal generator such as an oscillator (not shown), and outputs the various synchronizing signals that are thus generated so as to control timings of horizontal synchronization and vertical synchronization.

The horizontal base counter 131 is initialized by taking a rising edge of the horizontal synchronizing signal, which is generated in the synchronizing signal generating circuit 130, as a trigger and starts counting a rising edge of the clock PCLK. Further, the horizontal base counter 131 is initialized every time each of the divided periods A to D is passed, and outputs a count value in each of the divided periods to the AC allocation signal generating circuit 132 and the basic control signal generating circuit 133. Here, an internal state is incremented by 1 on each initialization after each of the divided periods passes. The internal state is initialized into "0" in the initialization by the horizontal synchronizing signal; the internal state is incremented to "1" in the initialization after the passing of the divided period A; the internal state is incremented to "2" in the initialization after the passing of the divided period B; and the internal state is incremented to "3" in the initialization after the passing of the divided period C. These values of the internal state are outputted to the AC allocation signal generating circuit 132.

In synchronization with the counter update clock from the counter update clock generating section 120, the AC allocation signal generating circuit 132 decodes the internal state value of the horizontal base counter 131, generates first to fourth address counter allocation signals (AC allocation signals), and outputs the first to fourth AC allocation signals to the AC mask signal generating circuit 134. The AC allocation signals indicate that the selected line address generating circuits are allocated with respect to the divided periods A to D. In the embodiment, the first to fourth AC allocation signals respectively correspond to the selected line address generating circuits 122a to 122d. The signals at H level indicate that the circuits are allocated to a corresponding divided period, while the signals at L level indicate that the circuits are not allocated to a corresponding divided period.

The AC allocation signal generating circuit 132 may generate the AC allocation signal by shifting a state thereof at a timing of initialization of the horizontal synchronizing signal and the horizontal base counter 131.

The basic control signal generating circuit 133 decodes the count value of the horizontal base counter 131, generates various basic control signals for executing various processings related to readout that is executed in each of the divided periods, and sequentially outputs the various basic control signals that are generated to the execution control signal generating circuit 135.

Here, the basic control signals include: a LOAD signal, a Reset signal, an ADC signal, a DOUT signal, and the like. The LOAD signal is composed of a group of control signals of respective circuits for realizing a readout processing of accumulated charges. The Reset signal is composed of a group of control signals of respective circuits for realizing a reset processing of the accumulated charges. The ADC signal is composed of a group of control signals for controlling the A/D converter 16b for converting pixel signal data into digital pixel data. The DOUT signal is composed of a group of control signals of respective circuits for outputting the pixel data obtained by A/D converting the pixel signal data by the A/D converter 16b.

The AC mask signal generating circuit 134 generates first to fourth address counter mask signals (hereinafter, referred to as AC mask signals) based on first to fourth address counter enable control signals (AC enable control signals) from the selected line address generating circuits 122a to 122d and the first to fourth AC allocation signals from the AC allocation signal generating circuit 132 and outputs the first to fourth AC mask signals that are generated to the execution control signal generating circuit 135.

Here, each of the first to fourth AC enable control signals at H level indicates that a corresponding address counter in the period is enabled, while each of the first to fourth AC enable control signals at L level indicates that a corresponding address counter in the period is disabled.

Specifically, the AC mask signal generating circuit 134 includes an AND circuit. The AC mask signal generating circuit 134 outputs signals indicating results, which are provided by the AND circuit, of AND operations between the first to fourth AC enable control signals and the first to fourth AC allocation signals as first to fourth AC mask signals. The AND operations are executed with respect to a pair of the first AC enable control signal and the first AC allocation signal, a pair of the second AC enable control signal and the second AC allocation signal, a pair of the third AC enable control signal and the third AC allocation signal, and a pair of the fourth AC enable control signal and the fourth AC allocation signal. The signals of results of the AND operations in this order are the first to fourth AC mask signals.

That is, when the AC enable control signal is valid (H level) and the AC allocation signal shows an allocated state (H level), a mask signal at H level is outputted. When any of the AC enable control signal and the AC allocation signal is at L level, a mask signal at L level is outputted.

The execution control signal generating circuit 135 generates an execution control signal based on the various basic control signals (LOAD, ADC, Reset, etc.) with respect to each of the divided periods from the basic control signal generating circuit 133 and the first to fourth AC mask signals from the AC mask signal generating circuit 134, and outputs the execution control signal that is generated to each component (the drive pulse generator 14, the horizontal transfer section 16, etc.) of a control object.

Specifically, the execution control signal generating circuit 135 includes an AND circuit. The execution control signal generating circuit 135 outputs signals indicating results of AND operations between the various basic control signals and the AC mask signals as the execution control signals.

That is, when the AC mask signal is at L level, an execution control signal at L level is always generated, and the execution control signal at L level is supplied to each component of the control object (equivalent to no-signal). Accordingly, each component of the control object is not permitted to operate. On the other hand, when the AC mask signal is at H level, the basic control signal is supplied as it is to each component of the control object. Accordingly, each component of the control object operates.

Next, referring to FIG. 4, an internal structure of the selected line address generating circuit 122*a* will be described.

Figure 4:
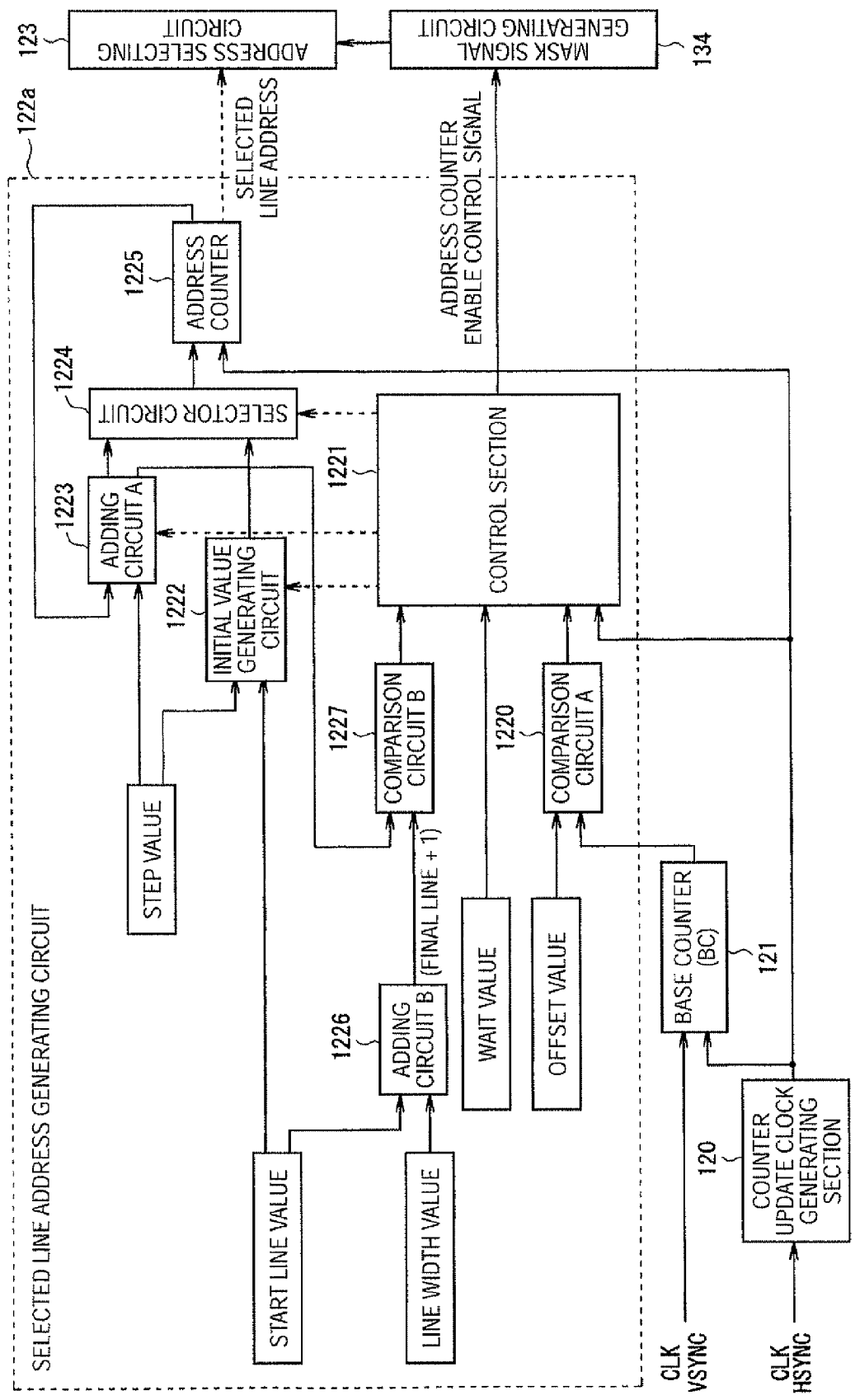
FIG. 4 is a block diagram illustrating an internal structure of a selected line address generating circuit 122a in a case of counting up.

FIG. 4 is a block diagram illustrating an internal structure of the selected line address generating circuit 122*a* in a case of counting up.

As shown in FIG. 4, the selected line address generating circuit 122*a* includes a comparison circuit A 1220, a control section 1221, an initial value generating circuit 1222, an adding circuit A 1223, a selector circuit 1224, an address counter 1225, an adding circuit B 1226, and a comparison circuit B 1227.

In the present embodiment, one horizontal scanning period is a period of one clock of the counter update clock, and a count value at the address counter 1225 is updated at a rising edge of the counter update clock. Therefore, a definition for a period during which the counter update clock is at "High" level is not required.

Here, the register 11 stores setting information of each of operation modes, an offset value, a start line value, a line width value, a step value, a wait value, and the like as control data of the address counter 1225. The information of these is set with respect to each of the selected line address generating circuits 122*a* to 122*d* by a user and used for controlling a counting operation of the address counter 1225 in each of the selected line address generating circuits.

In the embodiment, the operation modes mentioned above include a normal mode, a repeating mode, and an initial value adding mode. Details of the modes will be described later.

The offset value is used for determining a start timing of the counting operation of the address counter 1225.

The start line value is used for setting an initial value of the count value of the address counter 1225 and a count width (range) for counting.

The line width value is used for setting a count width (range) in which the address counter 1225 counts. Specifically, the count width is set based on the start line value and the line width value.

The step value is used for setting a step width in counting up of the address counter 1225.

The wait value is used for interposing a wait time between one counting operation and another counting operation, when a counting operation performed in a range from the initial count value to the maximum count value is repeated under the repeating mode or the initial value adding mode.

The comparison circuit A 1220 compares the offset value acquired from the register 11 and the count value of the base counter 121. When the offset value and the count value agree, the comparison circuit A 1220 outputs a signal for informing the agreement to the control section 1221.

The control section 1221 controls the counting operation of the address counter 1225 by controlling operations of the initial value generating circuit 1222, the adding circuit A 1223, and the selector circuit 1224. Further, the control section 1221 outputs the address counter enable control signal (the first AC enable control signal) for controlling validity and invalidity of a selected line address to the AC mask signal generating circuit 134 in response to the counting operation of the address counter 1225.

The initial value generating circuit 1222 outputs the start line value stored in the register 11 to the selector circuit 1224. Further, the circuit 1222 generates an initial value based on the step value stored in the register 11 when the initial value adding mode is set.

The adding circuit A 1223 adds the count value of the address counter to the step value stored in the register 11.

The selector circuit 1224 outputs either of a value received from the adding circuit A 1223 or a value received from the initial value generating circuit 1222 to the address counter 1225 in response to the control signal from the control section 1221.

The address counter 1225 outputs the value received from the selector circuit 1224 to the address selecting circuit 123 as a selected line address and to the adding circuit A 1223.

The adding circuit B 1226 adds the start line value and the line width value that are stored in the register 11.

The comparison circuit B 1227 compares an added result A obtained by the adding circuit A 1223 with an added result B obtained by the adding circuit B 1226. When the comparison circuit B 1227 detects a state of "the added result A≧the added result B", the comparison circuit B 1227 informs the state to the control section 1221.

Hereinafter, a common operation to the normal mode, the repeating mode, and the initial value adding mode will be described.

Detecting the start of an operation, the control section 1221 gets in a "start waiting" state. Under this state, when the control section 1221 receives a signal for informing that the offset value and the count value of the base counter 121 agree from the comparison circuit A 1220, the control section 1221 outputs an instruction signal to the initial value generating circuit 1222. The instruction signal instructs the initial value generating circuit 1222 to send the start line value acquired from the register 11 as it is to the selector circuit 1224.

When the initial value generating circuit 1222 receives the instruction signal, the circuit 1222 outputs the start line value acquired from the register 11 to the selector circuit 1224 as it is.

Further, the control section 1221 controls the selector circuit 1224 so that the selector circuit 1224 sends the start line value received from the initial value generating circuit 1222 to the address counter 1225 as it is. In particular, when the offset value and the count value agree, the control section 1221 outputs a signal for informing the agreement to the selector circuit 1224.

Based on the signal, the selector circuit 1224 outputs the start line value received from the initial value generating circuit 1222 to the address counter 1225, and the start line value is set to be as an initial value of the count value in the address counter 1225.

Further, the control section 1221 outputs the first AC enable control signal to the AC mask signal generating circuit 134 at a timing of updating (timing of counting up) the address counter 1225 (at a rising edge of the counter update clock) and changes an internal state thereof to a "count-up" mode.

Since the address selecting circuit 123 receives also address values from the selected line address generating circuits 122b to 122d in parallel, the circuit 123 selects a selected line address that is valid in a time dividing manner based on the first to fourth AC mask signals from the AC mask signal generating circuit 134, and outputs the address value that is selected to the address decoding section 124. Specifically, the circuit 123 determines that an address value received from the selected line address generating circuit and corresponding to the AC mask signal at H level among the first to fourth AC mask signals is valid and outputs the address value to the address decoding section 124. On the other hand, when the AC mask signal is at L level, the circuit 123 determines that an address value from the corresponding selected line address generating circuit is invalid, and does not output the address value to the address decoding section 124. As described above, the AC mask signal generating circuit 134 generates the first to fourth AC mask signals such that only one of the signals changes to H level in each of the divided periods A to D.

The address decoding section 124 performs a decode processing with respect to the address value received from the address selecting circuit 123. Specifically, the decode processing is to output a selecting signal, for activating sensor cells on a line position that is indicated by the inputted address value, to the drive pulse generator 14. The drive pulse generator 14 outputs a pulse signal corresponding to an indicated processing of the readout processing or the reset processing to the sensor cell array 15 based on the selecting signal received from the address decoding section 124.

If the internal state is changed into a "count-up" mode, the adding circuit A 1223 adds the step value acquired from the register 11 to the count value from the address counter 1225, and outputs the added result A to the selector circuit 1224 and the comparison circuit B 1227. However, in a case where the control section 1221 indicates "adding inhibition", the adding circuit A 1223 outputs the count value received from the address counter 1225 to the selector circuit 1224 and the comparison circuit B 1227 as it is.

Meanwhile, the adding circuit B 1226 adds the start line value acquired from the register 11 to the line width value acquired from the same and sends the added result to the comparison circuit B 1227. Accordingly, the added result B becomes "the maximum count value (an address value of a final line)+1".

The comparison circuit B 1227 compares the added result B received from the adding circuit B 1226 with the added result A received from the adding circuit A 1223. When a state of "an added result A≧an added result B" is detected, the comparison circuit B 1227 outputs a signal informing this state to the control section 1221.

When the control section 1221 receives the information from the comparison circuit B 1227, the control section 1221 performs an operation corresponding to the set mode stored in the register 11.

Next, an operation in each of the normal mode, the repeating mode, and the initial value adding mode will be described.

First, the normal mode will be described.

In the normal mode, the repeating mode and the initial value adding mode are not set. The normal mode is such a state that every time the base counter 121 and the offset value agree, the address counter 1225 is allowed to perform a count-up operation until the state of "the added result A≧the added result B" is detected.

Specifically, when the state of "the added result A≧the added result B" is detected, the control section 1221 gets back to the "start waiting" state at the rising edge of the counter update clock and sends the first AC enable control signal (L level) for invalidating the address of the selected line to the AC mask signal generating circuit 134.

Then, when the base counter 121 and the offset value agree again (when the control section 1221 receives information of the agreement from the comparison circuit A 1220), the control section 1221 outputs an instruction signal to the circuit 1222. The instruction signal instructs the circuit 1222 to send the start line value that is received to the selector circuit 1224 as it is. Thus the control section 1221 allows the address counter 1225 to perform the count-up operation until the state of "an added result A≧an added result B" is detected.

Next, the repeating mode will be described.

In the repeating mode, the address counter 1225 repeatedly performs the count-up operation in succession until the sate of "the added result A≧the added result B" is detected in a range from the initial value to the maximum count value.

Specifically, in the repeating mode, when the control section 1221 receives the information of the state of "the added result A≧the added result B" from the comparison circuit B 1227, the control section 1221 acquires a wait value from the register 11 and counts a counter update clock in the number of the wait value. Then the control section 1221 sets the start line value in the address counter 1225 through the initial value generating circuit 1222 and the selector circuit 1224 so as to allow the address counter 1225 to perform the counting operation again from the initial value that is set.

Concurrently with the starting of the wait operation, the control section 1221 sends the first AC enable control signal (L level) for invalidating the address of the selected line to the AC mask signal generating circuit 134.

Accordingly, a result of an AND operation between the first AC enable control signal and the first AC allocation signal becomes L level in the AC mask signal generating circuit 134, and the first AC mask signal at L level is outputted to the address selecting circuit 123. As a result, the address selecting circuit 123 determines that the selected line address from the selected line address generating circuit 122a is invalid, so that the circuit 123 does not output the address value to the address decoding section 124. Therefore, sensor cells corresponding to the selected line are kept to be inactive (disabled).

In a case where the wait value is "0", the wait operation is omitted and an initial value is set.

In the repeating mode, the control section 1221 receives only first information indicating the agreement between the offset value and the count value of the base counter 121 from the comparison circuit A 1220, and invalidates information after the first information.

Next, the initial value adding mode will be described.

In the initial value adding mode, when a value of the step width is 2 or more, the address counter 1225 repeatedly performs the counting operation. Every time the count-up operation is performed, "1" is added to an initial value of the address counter 1225 at the time and a next counting operation is performed by using the resulting value after the adding of the previous operation as a new initial value. The count-up operation is repeatedly performed until the comparison result of the comparison circuit B becomes "an added result A≧an added result B" until the value of the step width and the repeating number agree.

Specifically, under the initial value adding mode, when the control section 1221 receives the information of "the added result A≧the added result B" from the comparison circuit B 1227, the control section 1221 acquires a wait value from the register 11 and counts the counter update clock in the number of the wait value. Then the control section 1221 sends an instruction signal indicating to perform an adding processing of the initial value to the initial value generating circuit 1222.

When the initial value generating circuit 1222 receives the instruction signal from the control section 1221, the circuit 1222 adds "1" to an initial value at the time and outputs the added result as the new initial value to the selector circuit 1224.

Further, the control section 1221 controls the selector circuit 1224 so that the new initial value inputted into the selector circuit 1224 from the initial value generating circuit 1222 is sent to the address counter 1225 as it is.

Accordingly, the selector circuit 1224 outputs the new initial value received from the initial value generating circuit 1222 to the address counter 1225, and the new initial value is set to be an initial value of the count value in the address counter 1225.

The wait operation and the adding operation of the initial value are repeatedly performed in the same number as the value of the step width. Then, when a value of the repeating number becomes same as the value of the step width, the control section 1221 returns the initial value after the adding back to the original initial value before the adding and again performs the counting operation and the adding operation of the initial value in a similar way to the above from the original initial value. If a step width is "4" and an original initial value before adding is "1", for example, a counting operation is performed four times in sequence from "1" that is the original initial value, "2", "3", and "4" that are new initial values obtained by increasing the original initial value by 1 in each operation. After that, the initial value of "4" of the fourth counting operation is set back to the original initial value of "1", and similar counting operation is repeated again.

In a down-counting, the processing is changed into the one to subtract each of the step value and the line width value. Specific processing of the adding circuit B 1226 is expressed as "a start line value−a line width value+1". In the down-counting, the operation of the comparison circuit B 1227 is changed into "an added result A≦an added result B", and the initial value is "a start line value+a step value−1" in the initial value generating circuit 1222. After the comparison circuit A 1220 detects the agreement and informs the agreement to the control section 1221, the control section 1221 turns into the down-count mode. Other operations are basically same as those of the up-counting.

Further, since the selected line address generating circuits 122b to 122d have the similar structure to that of the selected line address generating circuit 122a, the description thereof will be omitted. However, names of the signals are changed as the second to fourth AC enable control signals, the second to fourth AC allocation signals, and the second to fourth AC mask signals with respect to the selected line address generating circuits 122b to 122d respectively.

More specific operations of the embodiment will be described with reference to FIGS. 5A to 7.

Figure 5A:
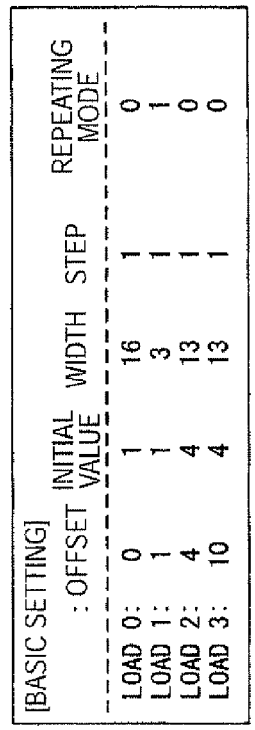
FIGS. 5A to 5C are diagrams for explaining an operation of the readout reset line address generating section 12.
Figure 5B:
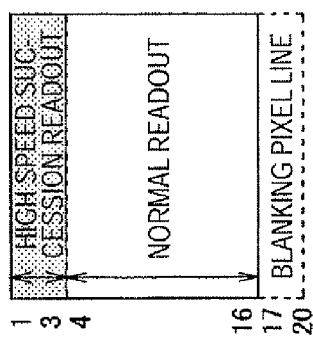
Figure 5C:
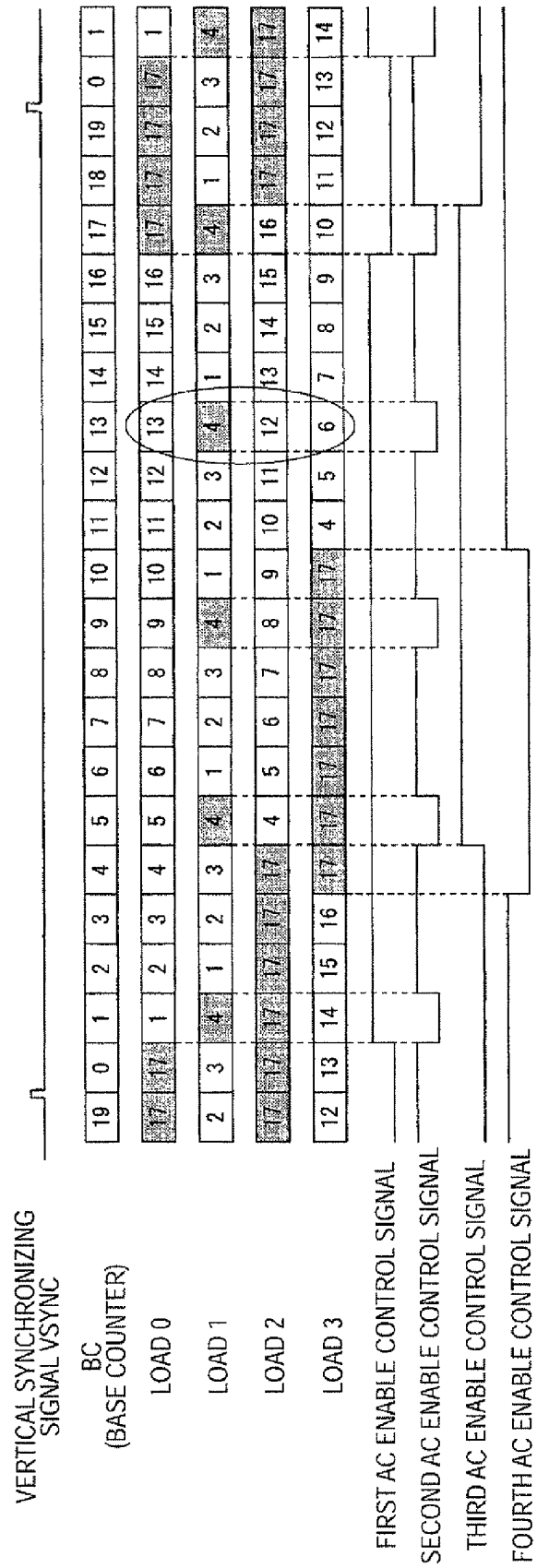
Figure 7:
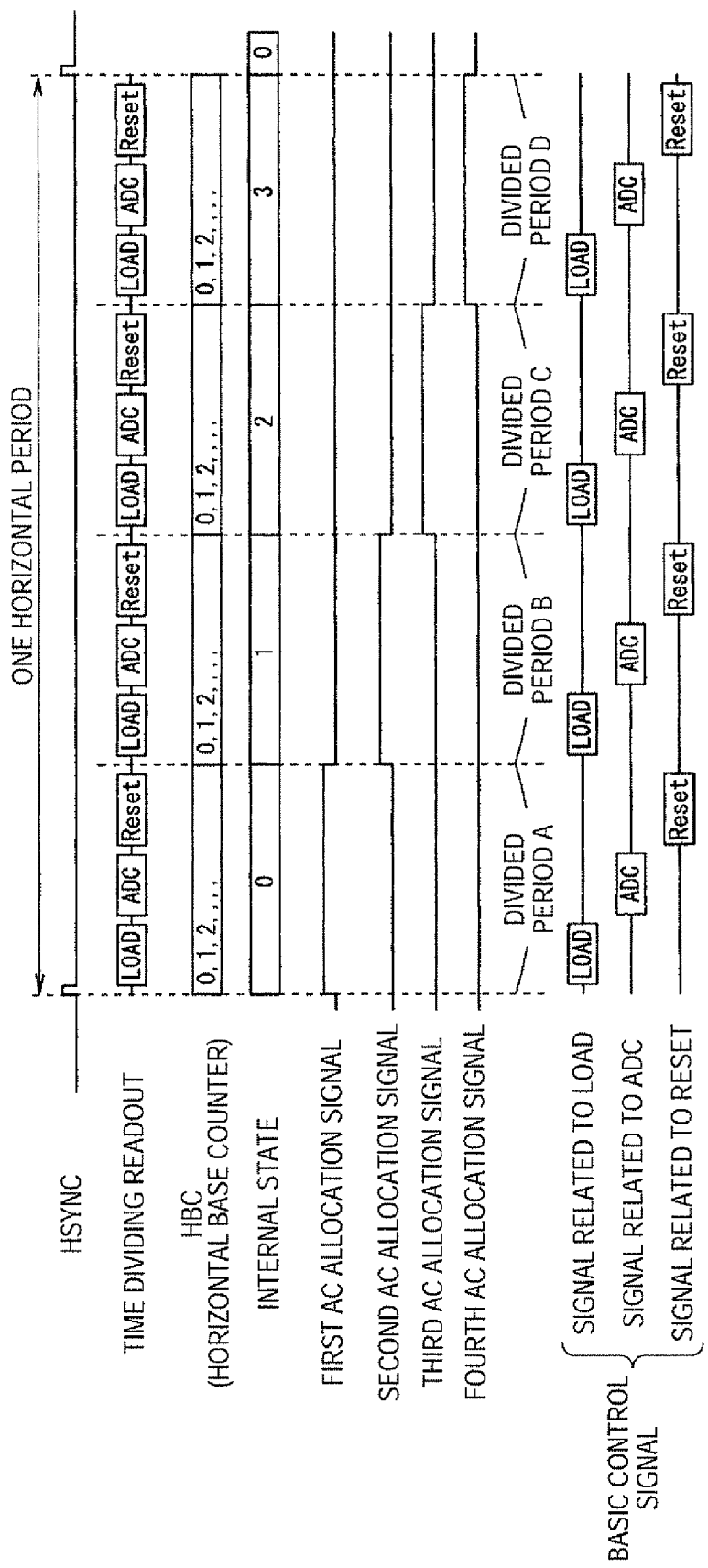
FIG. 7 is a timing chart of signals of the readout reset line address generating section 12 and basic control signals generated in a basic control signal generating circuit 133.

FIGS. 5A to 5C are diagrams for explaining an operation of the readout reset line address generating section 12. FIG. 5A shows an example of a pixel line structure. FIG. 5B shows an example of control data. FIG. 5C shows an example of an output value of each counter. FIG. 6 is a timing chart of each signal generated in the readout reset line address generating circuit 12 and the timing control section 13 in a horizontal scanning period circled in FIG. 5A. FIG. 7 is a timing chart of each signal of the readout reset line address generating section 12 and a basic control signal generated in the basic control signal generating circuit 133.

Here, a case that the same processings (a readout processing of accumulated charges, a digital conversion processing of pixel signal data that is read out, and a reset processing of the accumulated charges) are performed in each of the divided periods A to D in each horizontal scanning period will be described.

Further, as shown in FIG. 5A, active pixel lines are lines of number 1 to 16 and blanking pixel lines are lines of number 17 to 20. Further, among the active pixel lines, the lines of number 1 to 3 are set to be high speed readout object pixel lines, and the lines of number 4 to 16 are set to be normal readout object pixel lines. The base counter 121 is controlled so as to repeatedly perform a counting operation in a range from "0" to "19" with a step width of "1".

First, control data is sent to the imaging element 100 from the system controller and stored in the register 11 through the communication section 10.

In the control data, offset values are respectively set (stored) to be "0" with respect to the selected line address generating circuit 122a, "1" with respect to the circuit 122b, "4" with respect to the circuit 122c, and "10" with respect to the circuit 122d, as shown in FIG. 5B.

Further, start line values are respectively set to be "1" with respect to the selected line address generating circuits 122a and 122b, and "4" with respect to the circuits 122c and 122d. Line width values are respectively set to be "16" with respect to the selected line address generating circuit 122a, "3" with respect to the circuit 122b, and "13" with respect to the circuits 122c and 122d.

Step values are respectively set to be "1" with respect to the selected line address generating circuits 122a to 122d, and a wait value is set to be "1" with respect to the circuit 122b. The repeating mode is set with respect to the circuit 122b and the normal mode is set with respect to the rest of the circuits.

When the readout reset line address generating section 12 receives an indication of a start of an operation from the system controller, each of the selected line address generating circuits 122a to 122d turns into a start-waiting state. Hereinafter, a, b, c, and d are appended to the reference numerals of each element of the selected line address generating circuits 122a to 122d so as to distinguish an element from that of other circuits.

In the start-waiting state, a count value of the base counter 121 is initialized to "0" in synchronization with the vertical synchronizing signal and the horizontal synchronizing signal from the synchronizing signal generating circuit 130, and the base counter 121 starts a counting operation from the initial value of "0", as shown in FIG. 5C. When the count value becomes "0", the value agrees with the offset value "0" of the selected line address generating circuit 122a. Therefore, a start line value "1" is set as an initial value in the address counter 1225a.

At this time, the control section 1221a receives information of a detection of the agreement between the offset value "0" and the count value of the base counter 121. Since the control section 1221a is in the start-waiting state, the control section 1221a turns into a "count-up mode" at a timing of a rising edge of a next counter update clock, and outputs the first AC enable control signal at H level to the AC mask signal generating circuit 134, as shown in FIG. 5C.

On the other hand, receiving an indication of a start of an operation from the system controller, the timing control section 13 initializes the count value and an internal state value of the horizontal base counter 131 to "0" in synchronization with the selected line address generating circuits 122*a* to 122*d* with the horizontal synchronizing signal from the synchronizing signal generating circuit 130 as a trigger. Then, the horizontal base counter 131 starts counting the pixel clock PCLK outputted from the synchronizing signal generating circuit 130. In the horizontal base counter 131, an initializing processing with the horizontal synchronizing signal as a trigger, a processing of initializing the count value of the horizontal base counter 131 every time each of the divided periods A to D passes, and a processing of adding 1 to the internal state are repeatedly performed. The count value and the state value are outputted to each of the AC allocation signal generating circuit 132 and the basic control signal generating circuit 133.

Receiving the count value and the internal state value of "0" from the horizontal base counter 131, the AC allocation signal generating circuit 132 decodes the internal state value of "0". Thus the circuit 132 generates the first AC allocation signal that shifts to H level in the divided period A and the second to fourth allocation signal that shifts to L level in the divided period A, as shown in FIGS. 6 and 7, and outputs the signals to the AC mask signal generating circuit 134.

Namely, the AC allocation signal generating circuit 132 decodes the internal state values of "0 to 3" received from the horizontal base counter 131 so as to generate the first AC allocation signal that is at H level in the divided period A and at L level in the divided periods B to D; the second AC allocation signal that is at H level in the divided period B and at L level in the divided periods A, C, and D; the third AC allocation signal that is at H level in the divided period C and at L level in the divided periods A, B, and D; and the fourth AC allocation signal that is at H level in the divided period D and at L level in the divided periods A to C, and sequentially output these signals to the AC mask signal generating circuit 134.

The basic control signal generating circuit 133 decodes the count value from the horizontal base counter 131 so as to sequentially generate a LOAD signal for the readout processing of accumulated charges, an ADC signal for the A/D conversion processing of the signal that is read out, and a Reset signal for the reset processing of the accumulated charges in this order and sequentially output the LOAD signal, the ADC signal, and the Reset signal that are generated to the execution control signal generating circuit 135. In the embodiment, since the same processings are repeatedly performed in the divided periods A to D, a set of the basic control signals having the same content (the LOAD signal, the ADC signal, and the Reset signal) are outputted in each of the divided periods.

Receiving the first AC enable control signal from the control section 1221*a* and the first AC allocation signal from the AC allocation signal generating circuit 132, the AC mask signal generating circuit 134 calculates an AND between these signals by its AND circuit so as to generate the first AC mask signal at L level or H level showing a result of the AND operation and output the result to the address selecting circuit 123 and the execution control signal generating circuit 135.

Specifically, when both of the first AC enable control signal and the first AC allocation signal are at H level, the first AC mask signal shifts to H level. When any of the first AC enable control signal and the first AC allocation signal is at L level, the first AC mask signal shifts to L level.

The first AC allocation signal is at H level only in the divided period A. Therefore, when the first AC enable control signal is at H level, the first AC mask signal shifts to H level only in the divided period A.

In the execution control signal generating circuit 135, the AND circuit performs an AND operation between the basic control signal received from the basic control signal generating circuit 133 and the first AC mask signal, and a signal of a result of the AND operation is supplied to each component of a control object as an execution control signal. That is, when the first AC enable control signal is at H level, the first AC mask signal shifts to H level in the divided period A. Therefore, the basic control signal from the basic control signal generating circuit 133 is supplied as it is to each component of the control object as the execution control signal.

Further, the control section 1221*a* outputs an instruction signal to the initial value generating circuit 1222*a* so as to instruct the circuit 1222*a* to output a start line value of 1 to the selector circuit 1224*a*. Also, the control section 1221*a* outputs an instruction signal to the selector circuit 1224*a* so as to instruct the circuit 1224*a* to output the inputted value (=1) from the initial value generating circuit 1222*a* to the address counter 1225*a*. Thus, the initial value of 1 is set in the address counter 1225*a*. Then the set value of 1 is outputted to the address selecting circuit 123.

The first AC mask signal is at H level in the divided period A, so that the address selecting circuit 123 outputs the count value of 1 to the address decoding section 124 only in the period A.

Accordingly, sensor cells on a line position corresponding to the address value of 1 are activated and the basic control signal is supplied to each component of the control object, so that the readout processing, the A/D conversion processing, and the reset processing are performed with respect to the sensor cells that are activated.

Furthermore, the control section 1221*a* that turns to the count-up mode outputs an instruction signal, which instructs to second the input value from the adding circuit A 1223*a* to the address counter 1225*a*, to the selector circuit 1224*a*. On the other hand, the adding circuit A 1223*a* receives 1 from the address counter 1225*a*, and adds the step value of 1 to 1 so as to output the added result of 2 to the selector circuit 1224*a*.

The selector circuit 1224*a* outputs 2 that is received from the adding circuit A 1223*a* to the address counter 1225*a* at a timing of a rising edge of a next counter update clock. Accordingly, 2 is outputted from the address counter 1225*a* to the address selecting circuit 123 and the adding circuit A 1223*a*.

Thus, the addition of the "step value of 1" to the output value of the address counter 1225*a*, the output of the added result to the address counter 1225*a*, and the output of the added result to the address selecting circuit 123 are performed in sequence.

Receiving an address value of the added result, the address selecting circuit 123 outputs the address value to the address decoding section 124 so as to activate sensor cells on a line position corresponding to the address value during the divided period A. During the divided period A, the readout processing, the A/D conversion processing, and the reset processing are performed with respect to the sensor cells that are activated.

In a meantime of the count-up operation, the adding circuit B 1226*a* adds the start line value of 1 to the line width value of 16, and outputs the added result of 17 to the comparison circuit B 1227*a*.

The comparison circuit B 1227*a* compares the added result of 17 of the adding circuit B 1226*a* with the added result of the adding circuit A 1223*a*. When the comparison circuit B 1227*a* detects a state of "an added result A≧an added result B", the circuit 1227*a* outputs a signal informing the state to the control section 1221*a*. That is, when the count value of the address counter 1225*a* becomes 16, the added result A of the adding circuit A 1223*a* becomes 17. Thus, a state of "17≧the added result B (=17)" satisfies the condition. Therefore, the comparison circuit B 1227*a* detects the state and outputs informing signal to the control section 1221*a*.

Receiving the information, the control section 1221*a* outputs an instruction signal of "adding inhibition" to the adding circuit A 1223*a* and at the same time outputs the first AC enable control signal at L level to the AC mask signal generating circuit 134, as shown in FIG. 5C. Then the control section 1221*a* turns into the "start waiting" state concurrently with the output of these signals. At this time, the count value of the address counter 1225*a* is updated to 17.

Since the AC mask signal generating circuit 134 receives the first AC enable control signal at L level from the control section 1221*a*, the circuit 134 outputs the first AC mask signal at L level to the address selecting circuit 123 and the execution control signal generating circuit 135.

Therefore, during a period in which the first AC enable control signal is at L level, sensor cells on a line position corresponding to the count value of 17 are not activated. Further, the execution control signal generating circuit 135 supplies an execution control signal at L level to each component of the control object, so that the processings described above are not performed.

Since the adding circuit A 1223*a* has received the instruction of "adding prohibition" from the control section 1221*a*, the adding circuit A 1223*a* continues to output 17, which is the output value of the address counter 1225*a*, as an output value of the adding circuit A. Accordingly, as shown in FIG. 5C, during a period in which the count value of the base counter 121 is 17 to 0, the count value of the address counter 1225*a* is kept to be 17 (an invalid value).

Then, when an agreement between the offset value and the count value of the base counter 121 is detected in the comparison circuit A 1220*a* again, the control section 1221*a* turns into the "count-up mode" and, at the same time, outputs the AC enable control signal at H level to the AC mask signal generating circuit 134 and a release signal of the "adding prohibition" to the adding circuit A 1223*a*.

Similar operations are repeatedly performed until the provision of an instruction of a stop of operations from the system controller. Here, the update timing of the base counter 121 and that of each of the address counters are same.

Therefore, as shown in LOAD 0 of FIG. 5C, address values obtained by counting up by 1 from the initial value of 1 to the count width value (the maximum count value) of 16 are sequentially outputted to the address selecting circuit 123 in each horizontal scanning period. Further, since the first AC enable control signal at H level is outputted from the control section 1221*a* during a period in which the count value of LOAD 0 is from 1 to 16, the first AC mask signal is at H level during a period in which the first AC allocation signal shifts to H level (during the divided period A). Therefore, sensor cells on line positions corresponding to the address values of 1 to 16 are activated in sequence by the address decoding section 124 in the divided period A of each of the horizontal scanning period. Accordingly, as shown in FIGS. 6 and 7, the readout processing, the A/D conversion processing, and the reset processing are sequentially performed with respect to the sensor cells that are activated.

On the other hand, in a period of the count value of 17 (invalid period), the first AC enable control signal at L level is outputted from the control section 1221*a*, so that the first AC mask signal shifts to L level. In the period of the L level, sensor cells on a line position corresponding to the address value of 17 become inactive in the divided period A. Further, the execution control signal at L level is supplied to each component, so that the processings are not performed to the sensor cells.

When the base counter 121 counts up by 1 from the initial value of 0 in a manner corresponding to the counter update clock and the count value becomes 1, the count value agrees with the offset value of 1 of the selected line address generating circuit 122*b*. Therefore, the start line value of 1 is set as the initial value in the address counter 1225*b*.

At this time, the control section 1221*b* receives information of a detection of the agreement from the comparison circuit A 1220*b*. Since the control section 1221*b* is in the "start-waiting" state, the control section 1221*b* turns into the "count-up mode" at a timing of a rising edge of a next counter update clock, and outputs the second AC enable control signal at H level to the AC mask signal generating circuit 134, as shown in FIG. 5C.

In the AC mask signal generating circuit 134, the AND circuit performs an AND operation between the second AC allocation signal and the second AC enable control signal. Then a signal of the result of the AND operation is outputted to each of the address selecting circuit 123 and the execution control signal generating circuit 135 as the second AC mask signal. The second AC allocation signal shifts to H level only in the divided period B. Therefore, when the second AC enable control signal is at H level, the second AC mask signal turns into H level only in the divided period B as well.

In the execution control signal generating circuit 135, the AND circuit performs an AND operation between the basic control signal received from the basic control signal generating circuit 133 and the second AC mask signal. Then, the circuit 135 supplies a signal of a result of the AND operation to each component of a control object as an execution control signal. That is, when the second AC enable control signal shifts to H level, the second AC mask signal shifts to H level in the divided period B. Therefore, the basic control signal from the basic control signal generating circuit 133 is supplied as it is to each component of the control object as the execution control signal.

Further, the control section 1221*b* outputs an instruction signal to the initial value generating circuit 1222*b* so as to instruct the circuit 1222*b* to output a start line value of 1 to the selector circuit 1224*b*. Also, the control section 1221*b* outputs an instruction signal to the selector circuit 1224*b* so as to instruct the circuit 1224*b* to output the input value (=1) from the initial value generating circuit 1222*b* to the address counter 1225*b*. Thus, the initial value of 1 is set in the address counter 1225*b*. Then the set value of 1 is outputted to the address selecting circuit 123 and the adding circuit A 1223*b*.

The second AC mask signal shifts to H level in the divided period B, so that the address selecting circuit 123 outputs the count value of 1 to the address decoding section 124 only in the period B.

Accordingly, sensor cells on a line position corresponding to the address value of 1 are activated and the basic control signal is supplied to each component of the control object, so that the readout processing, the A/D conversion processing, and the reset processing are performed with respect to the sensor cells that are activated.

Furthermore, the control section 1221*b* that is in the count-up mode outputs an instruction signal to the selector circuit

1224b so as to instruct the circuit 1224b to output the input value from the adding circuit A 1223b to the address counter 1225b. On the other hand, to the adding circuit A 1223b, 1 is inputted from the address counter 1225b. Accordingly, the adding circuit A 1223b adds the step value of 1 to 1, and outputs the added result of 2 to the selector circuit 1224b.

Therefore, 2 inputted from the adding circuit A 1223b is outputted from the selector circuit 1224b to the address counter 1225b at a timing of a rising edge of a next counter update clock. Accordingly, 2 is outputted from the address counter 1225b to the address selecting circuit 123 and the adding circuit A 1223b.

In this case as well, as shown in FIG. 5C, the second AC enable control signal shifts to H level and the second AC mask signal shifts to H level during the divided period B. Therefore, sensor cells on a line position corresponding to the address of 2 are activated and the basic control signal is supplied to each component of the control object as the execution control signal during the divided period B. Accordingly, the readout processing, the A/D conversion processing, and the reset processing are performed with respect to the sensor cells that are activated.

Thus, the addition of the step value of 1 to the output value of the address counter 1225b, the output of the added result to the address counter 1225b, and the output of the added result to the address selecting circuit 123 are performed in sequence.

In a meantime of the count-up operation, the adding circuit B 1226b adds the start line value of 1 to the line width value of 3, and outputs the added result of 4 to the comparison circuit B 1227b.

The comparison circuit B 1227b compares the added result of 4 of the adding circuit B 1226b with the added result of the adding circuit A 1223b. When the comparison circuit B 1227b detects a state of "an added result A≧an added result B", the circuit 1227b outputs a signal informing the state to the control section 1221b. That is, when the count value of the address counter 1225b becomes 3, the added result A of the adding circuit A 1223b becomes 4. Thus, a state of "4≧the added result B (=4)" satisfies the condition. Therefore, the comparison circuit B 1227b detects the result, and outputs an informing signal to the control section 1221b.

The control section 1221b has been set in the repeating mode. Therefore, when the control section 1221b receives the information above, the control section 1221b refers the wait value stored in the register 11 at a timing of a rising edge of the counter update clock and immediately outputs the second AC enable control signal at L level to the AC mask signal generating circuit 134 because the wait value is 1.

Accordingly, the AC mask signal generating circuit 134 generates the second AC mask signal at L level and outputs the mask signal at L level to the address selecting circuit 123 and the execution control signal generating circuit 135. As shown in FIG. 5C, the second AC enable control signal shifts to L level during one horizontal scanning period (wait period), so that the second AC mask signal also shifts to L level during one horizontal scanning period.

Since the wait value is 1, the control section 1221b continuously controls the initial value generating circuit 1222b and the selector circuit 1224b so as to set the start line value of 1 in the address counter 1225b at a timing of a rising edge of a next counter update clock. At the same time, the control section 1221b outputs the enable control signal at H level to the AC mask signal generating circuit 134.

By repeating the above processing, the address counter 1225b repeats the counting operation in succession as the output value becomes "1→2→3→4→1→2→3→4 . . . ".

Here, a period during which the count value is 4 is the wait period. Therefore, the selected line address during this period becomes invalid.

Therefore, as shown in LOAD 1 of FIG. 5C, address values obtained by counting up by 1 from the initial value of 1 to the count width value (the maximum count value) of 3 are sequentially outputted to the address selecting circuit 123 in each horizontal scanning period. After the count-up operation from 1 to 3 is finished, a count-up operation from the initial value of 1 to the maximum count value of 3 is performed again after a wait by one clock. Thus the count-up operation is performed repeatedly. Therefore, the address values obtained by counting up from 1 to 3 are repeatedly outputted, while interposing a wait of one clock, to the address selecting circuit 123 in succession.

Further, since the second AC enable control signal at H level is outputted from the control section 1221b during a period in which the count value of LOAD 1 is from 1 to 3, the second AC mask signal shifts to H level during a period in which the second AC allocation signal is at H level (during the divided period B). Accordingly, sensor cells on line positions corresponding to the address values of 1 to 3 are activated by the address decoding section 124 in the divided period B of each horizontal scanning period. Then the readout processing, the A/D conversion processing, and the reset processing are sequentially performed with respect to the sensor cells that are activated.

On the other hand, as shown in FIG. 6, in a period of the count value of 4 (wait period), the second AC enable control signal at L level is outputted from the control section 1221b, so that the second AC mask signal shifts to L level. In the period of the L level, sensor cells on a line position corresponding to the address value of 4 become inactive and the execution control signal at L level is supplied to each component, so that the processings are not performed to the sensor cells.

When the count value of the base counter 121 becomes "4", the value agrees with the offset value of "4" of the selected line address generating circuit 122c. Therefore, a start line value of "4" is set as an initial value in the address counter 1225c. Since the step width of the selected line address generating circuit 122c is 1, the address counter 1225c counts up by 1 from the initial value of 4 to the maximum count value of 16 (the initial value of 4+the count width value 13−1) (refer to LOAD 2 in FIG. 5C). Here, operations of the timing control section 13 with respect to the selected line address generating circuit 122c are same as those with respect to the selected line address generating circuit 122a except only for the offset value and the initial value.

That is, as shown in FIG. 5C, the third AC enable control signal at H level is outputted from the control section 1221c during a period in which the count value of LOAD 2 is from 4 to 16, so that the third AC mask signal shifts to H level during a period in which the third AC allocation signal is at H level (during the divided period C). Accordingly, the address decoding section 124 sequentially activates sensor cells on a line position corresponding to the address values of 4 to 16 in the divided period C of each horizontal scanning period, and as shown in FIGS. 6 and 7, the readout processing, the A/D conversion processing, and the reset processing are sequentially performed with respect to the sensor cells that are activated.

On the other hand, as shown in FIG. 5C, in a period of the count value of 17 (invalid period), the third AC enable control signal at L level is outputted from the control section 1221c, so that the third AC mask signal shifts to L level. In the period of the L level of the third AC mask signal, sensor cells on a line position corresponding to the address value of 17 in the divided period C become inactive and the execution control signal at L level is supplied to each component, so that each of the processings described above is not performed to the sensor cells.

When the count value of the base counter 121 becomes "10", the value agrees with the offset value of "10" of the selected line address generating circuit 122d. Therefore, a start line value of "4" is set as an initial value in the address counter 1225d. Since the step width of the selected line address generating circuit 122d is 1, the address counter 1225d counts up by 1 from the initial value of 4 to the count width value (the maximum count value) of 16 (refer to LOAD 3 in FIG. 5C). Here, operations of the timing control section 13 with respect to the selected line address generating circuit 122d are same as those with respect to the selected line address generating circuit 122c except only for the offset value.

That is, as shown in FIG. 5C, the fourth AC enable control signal at H level is outputted from the control section 1221d during a period in which the count value of LOAD 3 is from 4 to 16, so that the fourth AC mask signal shifts to H level during a period in which the fourth AC allocation signal is at H level (during the divided period D). Accordingly, the address decoding section 124 sequentially activates cells on line positions corresponding to the address values of 4 to 16 in the divided period D of each horizontal scanning period, and as shown in FIGS. 6 and 7, the readout processing, the A/D conversion processing, and the reset processing are sequentially performed with respect to the sensor cells that are activated.

On the other hand, as shown in FIG. 5C, in a period of the count value of 17 (invalid period), the fourth AC enable control signal at L level is outputted from the control section 1221d, so that the fourth AC mask signal shifts to L level. In the period of the L level of the fourth AC mask signal, sensor cells on a line position corresponding to the address value of 17 become inactive in the divided period D and the execution control signal at L level is supplied to each component, so that each of the processings described above is not performed to the sensor cells.

As described above, the imaging element 100 of the embodiment has such structure that the selected line address generating circuits are provided in the number of time divisions for the readout processing and the reset processing of accumulated charges and therefore operations of the circuits can be separately controlled, being able to perform various readout processings. The various readout processings include: repeatedly reading out charges from part of sensor cells of the sensor array 15 at high speed, reading out charges while skipping arbitrary number of lines, and interlaced readout, for example.

Further, the selected line address generating circuits can be separately controlled, so that only a part of the selected line address generating circuits can be stopped or driven or the setting thereof can be changed. Therefore, when a normal exposed image is continuously outputted, imaged image can be outputted by switching depending on the situation.

Output values of the plurality of selected line address generating circuits (122a to 122d) are selected in a time dividing manner by the address selecting circuit 123 and the output values that are selected are outputted to one address decoding section 124. Thus, the circuit structure is simplified.

Further, the basic control signal generating circuit 133 generates a basic control signal for processings performed in each divided period and sequentially outputs the basic control signal that is generated, in each divided period. Therefore, even if the number of time divisions is increased, the number of circuits is not required to be increased. Accordingly, the circuit structure can be simplified compared to a structure in which basic control signal generating circuits are provided for respective divided periods.

The selected line address generating circuits 122a to 122d generate the first AC enable control signal indicating that each of the circuits 122a to 122d is enabled or disabled in each horizontal scanning period, and the AC allocation signal generating circuit 132 generates the first to fourth AC allocation signals indicating whether respective selected line address circuits are allocated with respect to each of the divided periods. From these signals, the first to fourth AC mask singles are generated. The first to fourth AC mask singles indicate a processing related to readout of accumulated charges on a line, which corresponds to the address that is generated in each of the selected line address generating circuits, is valid or invalid. Then, from the first to fourth AC mask singles and the basic control signals, an execution control signal is generated so as to supply a signal that is same as the basic control signal to each component of the control object only during a period in which the processing is valid.

That is, presence of supply of the basic control signal to the control object in each divided period can be controlled by the first to fourth AC mask signals. Therefore, for example, in a case where there is a period during which a processing needs to be temporarily stopped (the invalid period or the wait period described above, for example) in each divided period, an execution control signal (at L level, for example) indicating invalidity is outputted in the period so as to be able to stop the execution of the processing. That is, an execution and a stop of the processing can be easily controlled without controlling at the basic control signal generating circuit 133. Therefore, complicated control processing can be executed by adding a simple circuit structure.

The sensor cell array 15 of the embodiment corresponds to a photoelectric conversion section of the first or second aspect. The readout reset line address generating section 12 of the embodiment corresponds to an address generating unit of the first or second aspect. The address decoding section 124 of the embodiment corresponds to an address decoding unit of the first or second aspect. The register 11 of the embodiment corresponds to the control information acquisition unit of the first aspect. The AC mask signal generating circuit 134 of the embodiment corresponds to a period determination signal generating unit of the first or second aspect. The basic control signal generating circuit 133 of the embodiment corresponds to a control signal generating unit of the first or second aspect. The drive pulse generator 14 and the horizontal transfer section 16 of the embodiment correspond to a processing performing unit of the first or second aspect. The execution control signal generating circuit 135 of the embodiment corresponds to a supply control unit of the first aspect. The AC allocation signal generating circuit 132 of the embodiment corresponds to an address counter allocation signal generating unit of the first aspect. The generating and outputting processings of the AC enable control signal by the control section 1221 in the embodiment corresponds to an address counter enable control signal generating unit of the first aspect.

The control data of the embodiment corresponds to control information of the first aspect. The comparison circuit A 1220, the control section 1221, the adding circuit B 1226, and the comparison circuit B 1227 of the embodiment correspond to an operation control section of the first aspect. The initial value generating circuit 1222, the adding circuit A 1223, the selector circuit 1224, and the address counter 1225 of the embodiment correspond to an address counter of the first aspect. The address selecting circuit 123 of the embodiment corresponds to a selecting circuit of the first aspect. The base counter 121 of the embodiment corresponds to a base counter of the first aspect.

In the embodiment, the readout reset line address generating section 12 is structured by hardware. However, a circuit mechanism that controls a counter operation of an address and composed of the comparison circuit A 1220, the control section 1221, the adding circuit B 1226, and the comparison circuit B 1227 may be realized by software.

In the embodiment, the timing control section 13 is structured by hardware. However, a part of components such as the execution control signal generating circuit 135 may be realized by software.

In the embodiment, operations of the imaging element 100 only in the normal mode, the repeating mode, and the initial value adding mode are described. However, other various operations can be performed by changing a way of control.

The entire disclosure of Japanese Patent Application No: 2008-075310, filed Mar. 24, 2008 is expressly incorporated by reference herein.

What is claimed is:

1. An imaging element that performs a processing, the processing being related to readout of accumulated charges, with respect to a predetermined line of a plurality of photoelectric elements in plural times in a time dividing manner in each horizontal scanning period, comprising:
    a photoelectric conversion unit having a structure in which the plurality of photoelectric conversion elements, the photoelectric conversion elements converting received light into a charge, are arranged in matrix and form a plurality of lines including the predetermined line;
    an address generating unit that generates an address indicating a position of the line of a processing object for each of a plurality of divided periods formed by time-dividing the each horizontal scanning period, and outputs the address that is generated in each of the divided periods in sequence;
    an address decoding unit activating the photoelectric conversion elements on a line position corresponding to the address, the address being sequentially outputted from the address generating unit, in each of the divided periods;
    a period determination signal generating unit that generates a period determination signal indicating one of validity and invalidity of the processing with respect to each of the divided periods and sequentially outputs the period determination signal that is generated in each of the divided periods;
    a control signal generating unit that generates a control signal for performing the processing in each of the plurality of divided periods and sequentially outputs the control signal that is generated in each of the divided periods;
    a processing performing unit performing the processing with respect to the line of the photoelectric conversion elements, the elements being activated by the address decoding unit, based on the control signal; and
    a supply control unit allowing the control signal, the control signal being sequentially outputted from the control signal generating unit, to be supplied to the processing performing unit when a corresponding divided period is valid, and preventing the control signal from being supplied to the processing performing unit when the divided period is invalid, based on the period determination signal.

2. The imaging element according to claim 1, further comprising:
    address counters of at least the same number as the number of time divisions;
    an operation control unit separately controlling an operation of each of the address counters;
    an address selecting circuit sequentially selecting an address counter from the address counters in a time dividing manner and outputting a count value of the address counter that is selected as an address indicating a position of the line;
    an address counter enable control signal generating unit generating an address counter enable control signal indicating one of a state that each of the address counters is enabled and a state that each of the address counters is disabled in the each horizontal scanning period, and outputting the address counter enable control signal that is generated; and
    an address counter allocation signal generating unit generating an address counter allocation signal indicating one of a state that each of the address counters is allocated and a state that each of the address counters is free from an allocation with respect to each of the divided periods, and outputting the address counter allocation signal that is generated, wherein the period determination signal generating unit generates the period determination signal indicating validity of the processing in a state of a first combination of the address counter enable control signal indicating an enabled state and the address counter allocation signal indicating an allocated state, and generates the period determination signal indicating invalidity of the processing in a state of a combination other than the state of the first combination.

3. The imaging element according to claim 2,
    wherein the address counter enable control signal generating unit generates the address counter enable control signal that indicates the enabled state and a disabled state respectively by two kinds of signal states of a high level and a low level,
    wherein the address counter allocation signal generating unit generates the address counter allocation signal that indicates the allocated state and a non-allocated state respectively by two kinds of signal states of a high level and a low level, and
    wherein the period determination signal generating unit includes a first AND calculating section performing an AND operation between the address counter enable control signal and the address counter allocation signal, and generates the period determination signal based on a signal indicating a calculation result obtained by the first AND calculating section.

4. The imaging element according to claim 3, wherein the supply control unit includes a second AND calculating section performing an AND operation between the control signal and the period determination signal, and supplies a signal indicating a calculation result obtained by the second AND calculating section to the processing performing unit.

5. The imaging element according to claim 2, further comprising
    a control information acquisition unit acquiring control information for controlling each of the address counters, wherein
the operation control unit separately controls each of the address counters based on the control information acquired at the control information acquisition unit.

6. The imaging element according to claim 5, further comprising a base counter performing a counting operation based on a counter update clock generated based on a horizontal synchronizing signal, wherein the control information includes an offset value of each of the address counters, and wherein when the offset value and a count value of the base counter agree, the operation control section allows each of the address counters to start the counting operation with a timing of the agreement as a trigger.

7. The imaging element according to claim 5, wherein the control information includes a step width value, a start line value, and a line width value of each of the address, and wherein the operation control section sets a step width in the counting operation of each of the address counters based on the step width value and allows each of the address counters to count by the step width that is set; sets an initial value of each of the address counters based on the start line value and allows each of the address counters to start the counting operation from the initial value that is set; and sets a maximum count value of each of the address counters based on the line width value and allows each of the address counters to perform the counting operation in a range from the initial value to the maximum count value that is set.

8. The imaging element according to claim 5, wherein a repeating mode in which the address counters repeatedly perform the counting operation in the range from the initial value to the maximum count value in succession can be set in the address counters, and the operation control section allows the address counters in which the repeating mode is set to repeatedly perform the counting operation in the range from the initial value that is set to the maximum value that is set in succession.

9. The imaging element according to claim 8, wherein the control information includes a wait value of each of the address counters, and wherein the operation control section sets a wait count number that is a count number for a wait of each of the address counters based on the wait value, allows the address counters, to which the repeating mode is set, to count the wait count number that is set every time one counting operation is finished in the counting operation repeatedly performed, and outputs a signal invalidating a count value during the counting of the wait count number to the address decoding unit.

10. An imaging element that performs a processing, the processing being related to readout of accumulated charges, with respect to a predetermined line of a plurality of photoelectric conversion elements in plural times in a time dividing manner in each horizontal scanning period, comprising:

a photoelectric conversion unit having a structure in which the plurality of photoelectric conversion elements, the photoelectric conversion elements converting incident light into a charge, are arranged in matrix and form a plurality of lines including the predetermined line;

an address generating unit that generates an address indicating a position of the line of a processing object for each of a plurality of divided periods formed by time-dividing the each horizontal scanning period, and outputs the address that is generated in each of the divided periods in sequence;

an address decoding unit activating the photoelectric conversion elements on a line position corresponding to the address, the address being sequentially outputted from the address generating unit, in each of the divided periods;

a period determination signal generating unit that generates a period determination signal indicating one of validity and invalidity of the processing with respect to each of the divided periods and sequentially outputs the period determination signal that is generated in each of the divided periods;

a control signal generating unit that generates a control signal for performing the processing in each of the plurality of divided periods and sequentially outputs the control signal that is generated in each of the divided periods; and a processing performing unit performing the processing with respect to the line of the photoelectric conversion elements, the elements being activated by the address decoding unit, based on the control signal outputted from the control signal generating unit.

* * * * *